US012744983B2

(12) United States Patent
Takeshita et al.

(10) Patent No.: US 12,744,983 B2
(45) Date of Patent: Sep. 22, 2026

(54) VEHICULAR CAMERA

(71) Applicant: Panasonic Automotive Systems Co., Ltd., Kanagawa (JP)

(72) Inventors: Takao Takeshita, Tokyo (JP); Yingchun Guan, Kanagawa (JP); Shinkuro Fujino, Kyoto (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 26 days.

(21) Appl. No.: 19/051,959

(22) Filed: Feb. 12, 2025

(65) Prior Publication Data

US 2025/0274646 A1 Aug. 28, 2025

(30) Foreign Application Priority Data

Feb. 26, 2024 (JP) ................................ 2024-026756

(51) Int. Cl.

| | |
|---|---|
| ***H04N 23/54*** | (2023.01) |
| ***B60R 1/26*** | (2022.01) |
| ***H04N 23/51*** | (2023.01) |
| ***H04N 23/55*** | (2023.01) |
| ***H04N 23/57*** | (2023.01) |

(52) U.S. Cl.

CPC ............... *H04N 23/54* (2023.01); *B60R 1/26* (2022.01); *H04N 23/51* (2023.01); *H04N 23/55* (2023.01); *H04N 23/57* (2023.01)

(58) Field of Classification Search

CPC ........ H04N 23/50; H04N 23/56; H04N 23/57; H04N 23/58

See application file for complete search history.

(56) References Cited

U.S. PATENT DOCUMENTS

| | | | | |
|---|---|---|---|---|
| 7,965,336 | B2 * | 6/2011 | Bingle .................. | B60S 1/0411 348/149 |
| 10,805,513 | B2 * | 10/2020 | Yang ...................... | H04N 23/55 |
| 12,342,060 | B2 * | 6/2025 | Usui ......................... | B60R 1/20 |
| 2017/0129418 | A1 * | 5/2017 | Koshiba ................. | H04N 23/00 |
| 2018/0006407 | A1 * | 1/2018 | Sasaki .................... | H01R 24/40 |
| 2018/0164528 | A1 * | 6/2018 | Sakamoto ............. | H04N 23/51 |
| 2018/0210161 | A1 * | 7/2018 | Park ....................... | G03B 17/55 |

(Continued)

FOREIGN PATENT DOCUMENTS

WO 2021125074 A1 6/2021

*Primary Examiner* — Sinh Tran
*Assistant Examiner* — Mehedi Nmn Hassan
(74) *Attorney, Agent, or Firm* — Seed Intellectual Property Law Group LLP

(57) ABSTRACT

A vehicular camera includes a lens unit, a circuit board, an imaging element, a conductive member disposed to accommodate at least the circuit board and the imaging element, a housing, and a resin member having predetermined thermal conductivity. The resin member is brought into contact with a first inner side surface of a large-diameter tubular portion of the housing through a first hole of a first planar portion of the conductive member, a second inner side surface of the large-diameter tubular portion through a second hole of a second planar portion of the conductive member, a third inner side surface of the large-diameter tubular portion through a third hole of a third planar portion of the conductive member, and a fourth inner side surface of the large-diameter tubular portion through a fourth hole of a fourth planar portion of the conductive member.

20 Claims, 17 Drawing Sheets

(56) References Cited

U.S. PATENT DOCUMENTS

| | | | | |
|---|---|---|---|---|
| 2019/0100158 | A1 * | 4/2019 | Wato | B60R 11/04 |
| 2019/0124243 | A1 * | 4/2019 | Mleczko | H04N 23/51 |
| 2019/0306966 | A1 * | 10/2019 | Byrne | G02B 7/028 |
| 2020/0288049 | A1 * | 9/2020 | White | H05K 1/181 |
| 2021/0122299 | A1 * | 4/2021 | Garcia | G03B 17/12 |
| 2021/0306538 | A1 * | 9/2021 | Solar | H05K 7/20136 |
| 2021/0368082 | A1 * | 11/2021 | Solar | H04N 23/51 |
| 2022/0089102 | A1 * | 3/2022 | Sauer | H04N 23/52 |
| 2022/0094826 | A1 * | 3/2022 | Moehrle | H04N 23/57 |
| 2022/0360691 | A1 * | 11/2022 | Dreiocker | H04N 23/57 |
| 2023/0008374 | A1 | 1/2023 | Owaki | |
| 2024/0040217 | A1 * | 2/2024 | Nakamura | G03B 17/55 |

* cited by examiner

V
5
3
4

VEHICULAR CAMERA

TECHNICAL FIELD

The present disclosure relates to a vehicular camera.

BACKGROUND ART

With demands for improvements in vehicle safety, introduction of autonomous driving functions and the like in recent years, development of vehicular cameras that are mounted on vehicles and capture the inside and outside of the vehicles have become active (for example, see Patent Literature 1).

CITATION LIST

Patent Literature

Patent Literature 1: WO2021/125074

SUMMARY OF INVENTION

Required levels relating to safety, automatic driving functions, and the like, which are required for vehicles, are improved, and further improvement in performance and the like are also required for vehicular cameras.

The present disclosure relates to a technique for providing a new vehicular camera.

The present disclosure provides a vehicle camera including a lens unit including a first tubular portion having a first tubular shape and at least one lens disposed inside the first tubular portion and on an optical axis; a circuit board including a first surface and a second surface opposite to the first surface; an imaging element electrically connected to the circuit board and disposed on the first surface of the circuit board on the optical axis; a conductive member disposed to accommodate at least the circuit board and the imaging element; a housing accommodating at least the circuit board, the imaging element, and the conductive member; and a resin member having predetermined thermal conductivity. The housing includes a second tubular portion having a second tubular shape and including at least a first inner side surface, a second inner side surface, a third inner side surface, and a fourth inner side surface; a first housing end portion disposed between the first tubular portion of the lens unit and the circuit board; and a second housing end portion disposed opposite to the first housing end portion in a first direction which is a direction along the optical axis and at least partially faces the second surface of the circuit board. The conductive member includes a bottom surface portion that at least partially faces the second surface of the circuit board, is disposed at the second housing end portion of the housing, and has a first shape including at least a first side, a second side, a third side, and a fourth side in a plan view of the conductive member; a first planar portion extending from the first side of the bottom surface portion in a second direction, which is a direction away from the second housing end portion of the housing, and disposed along the first inner side surface of the second tubular portion of the housing; a second planar portion extending in the second direction from the second side of the bottom surface portion and disposed along the second inner side surface of the second tubular portion of the housing; a third planar portion extending in the second direction from the third side of the bottom surface portion and disposed along the third inner side surface of the second tubular portion of the housing; a fourth planar portion extending in the second direction from the fourth side of the bottom surface portion and disposed along the fourth inner side surface of the second tubular portion of the housing; at least one first hole penetrating the first planar portion; at least one second hole penetrating the second planar portion; at least one third hole penetrating the third planar portion; and at least one fourth hole penetrating the fourth planar portion. The resin member is disposed at least between the second surface of the circuit board and the bottom surface portion of the conductive member. The resin member is brought into contact with the first inner side surface of the second tubular portion of the housing through the first hole of the first planar portion of the conductive member, the second inner side surface of the second tubular portion of the housing through the second hole of the second planar portion of the conductive member, the third inner side surface of the second tubular portion of the housing through the third hole of the third planar portion of the conductive member, and the fourth inner side surface of the second tubular portion of the housing through the fourth hole of the fourth planar portion of the conductive member.

According to the present disclosure, the resin member is brought into contact with the inner side surface of the housing through the hole of the conductive member, and thus heat generated inside the housing can be efficiently dissipated. In addition, by appropriately designing the hole of the conductive member in consideration of a noise shielding effect, it is possible to prevent the noise from passing through the hole and prevent deterioration of sealing performance.

DESCRIPTION OF EMBODIMENTS

Hereinafter, embodiments that specifically disclose a vehicular camera according to the present disclosure will be described in detail with reference to the drawings as appropriate. However, unnecessarily detailed descriptions may be omitted. For example, detailed descriptions of already well-known matters and redundant descriptions of substantially the same configuration may be omitted. This is to avoid unnecessary redundancy of the following description and facilitate understanding of those skilled in the art. It should be noted that the accompanying drawings and the following description are provided for those skilled in the art to sufficiently understand the present disclosure, and are not intended to limit the subject matter described in the claims.

(Vehicle on which Vehicular Camera is Mounted)

Figure 1:
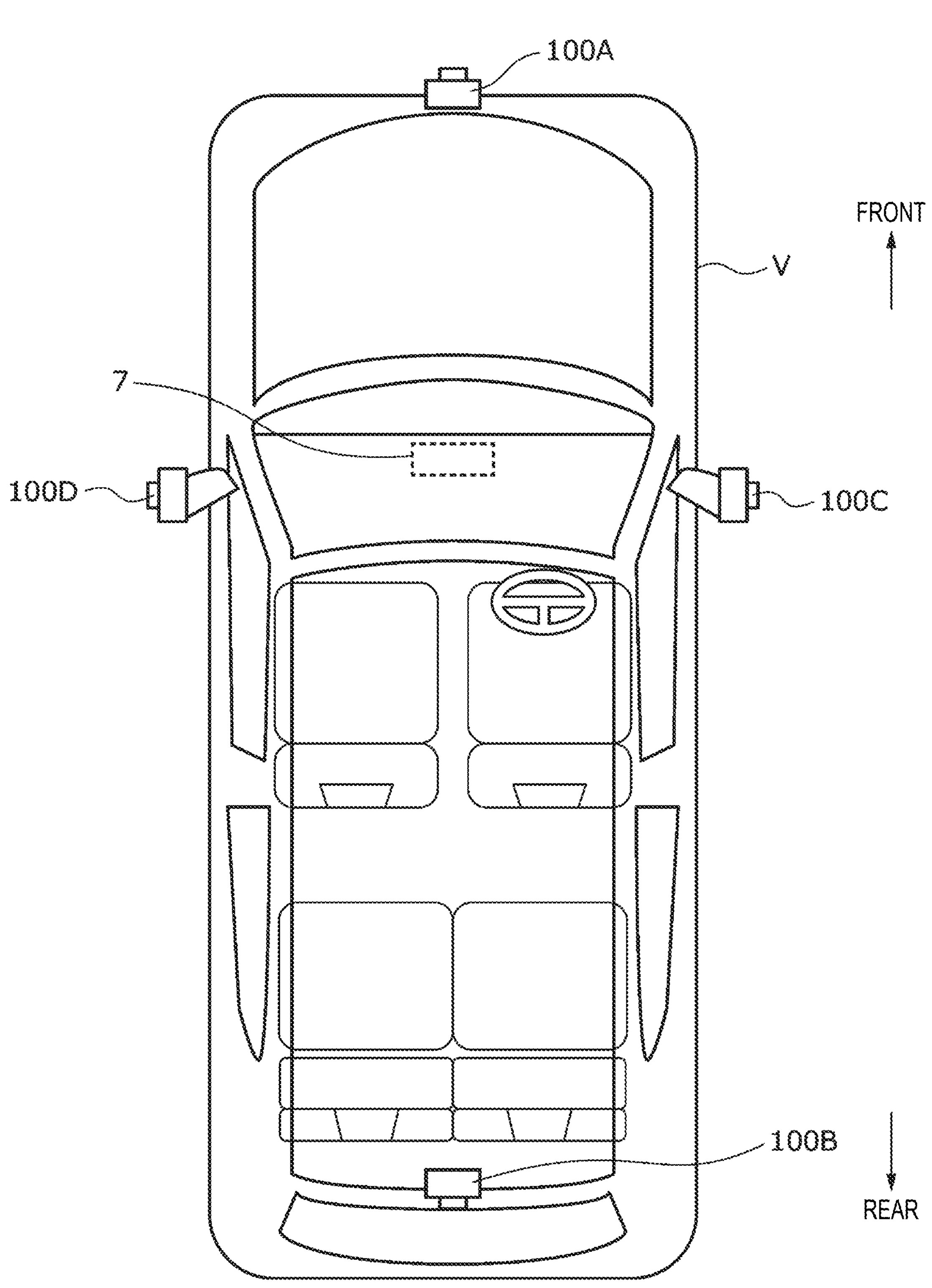
FIG. 1 is an example of a vehicle, and is a top view of the vehicle on which vehicular cameras are mounted.

FIG. 1 is an example of a vehicle, and is a top view of the vehicle on which vehicular cameras are mounted. As a vehicular camera 100, a vehicular camera 100A, a vehicular camera 100B, a vehicular camera 100C, and a vehicular camera 100D are mounted on a vehicle V. The vehicular camera 100A is a front camera, the vehicular camera 100B is a rear camera, the vehicular camera 100C is a right side camera, and the vehicular camera 100D is a left side camera. The vehicular cameras 100A to 100D are, for example, wide-angle cameras having an angle of view of about 180°, and are disposed to capture images showing an entire periphery of the vehicle V.

For example, the vehicular camera 100A is provided in a front grille of the vehicle V, and captures an image of a front region in a direction of looking down obliquely with respect to the ground. The vehicular camera 100B is provided in a roof spoiler of the vehicle V, and captures an image of a rear region in a direction of looking down obliquely with respect to the ground. The vehicular camera 100C and the vehicular camera 100D are provided in side mirrors of the vehicle V, and capture images of lateral regions in directions of looking down obliquely with respect to the ground, respectively.

Figure 2:
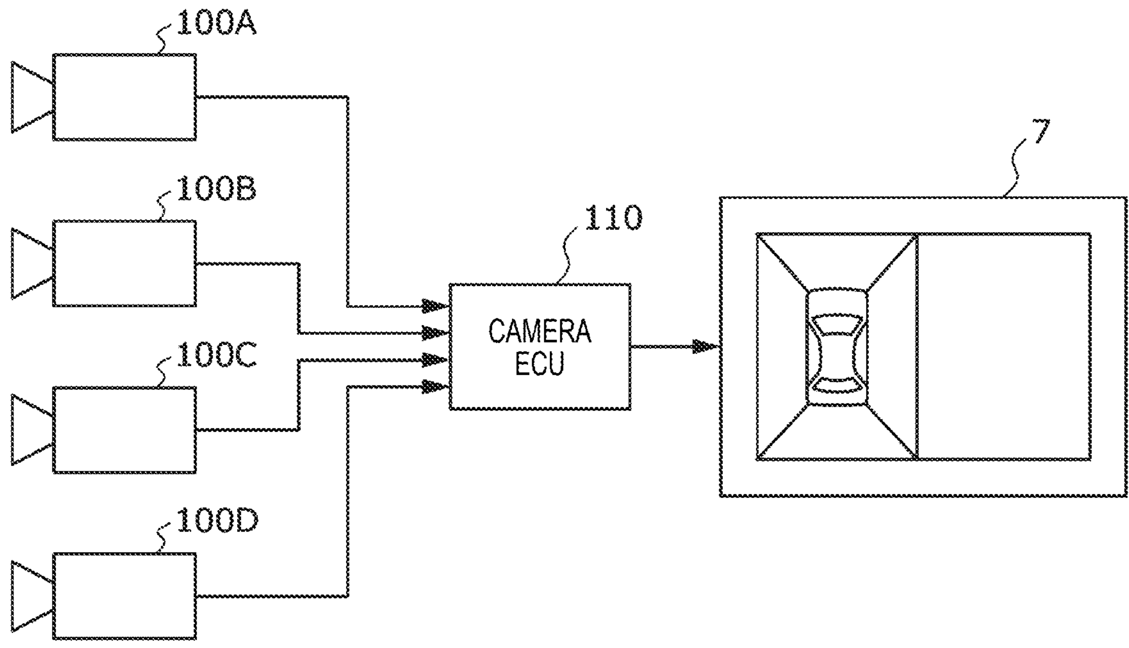
FIG. 2 is a block diagram illustrating a connection example of the vehicular cameras provided in the vehicle shown in FIG. 1, a camera ECU, and a display.

FIG. 2 is a block diagram illustrating a connection example of the vehicular cameras 100A to 100D provided in the vehicle V shown in FIG. 1, a camera ECU 110, and a display 7. The camera electronic control unit (ECU) 110 in FIG. 2 synthesizes the images captured by the vehicular cameras 100A to 100D, and displays a synthesized image on the display 7 of a navigation system disposed on an instrument panel, for example. An occupant can visually recognize the display 7 and check a situation around the vehicle V.

Figure 3:
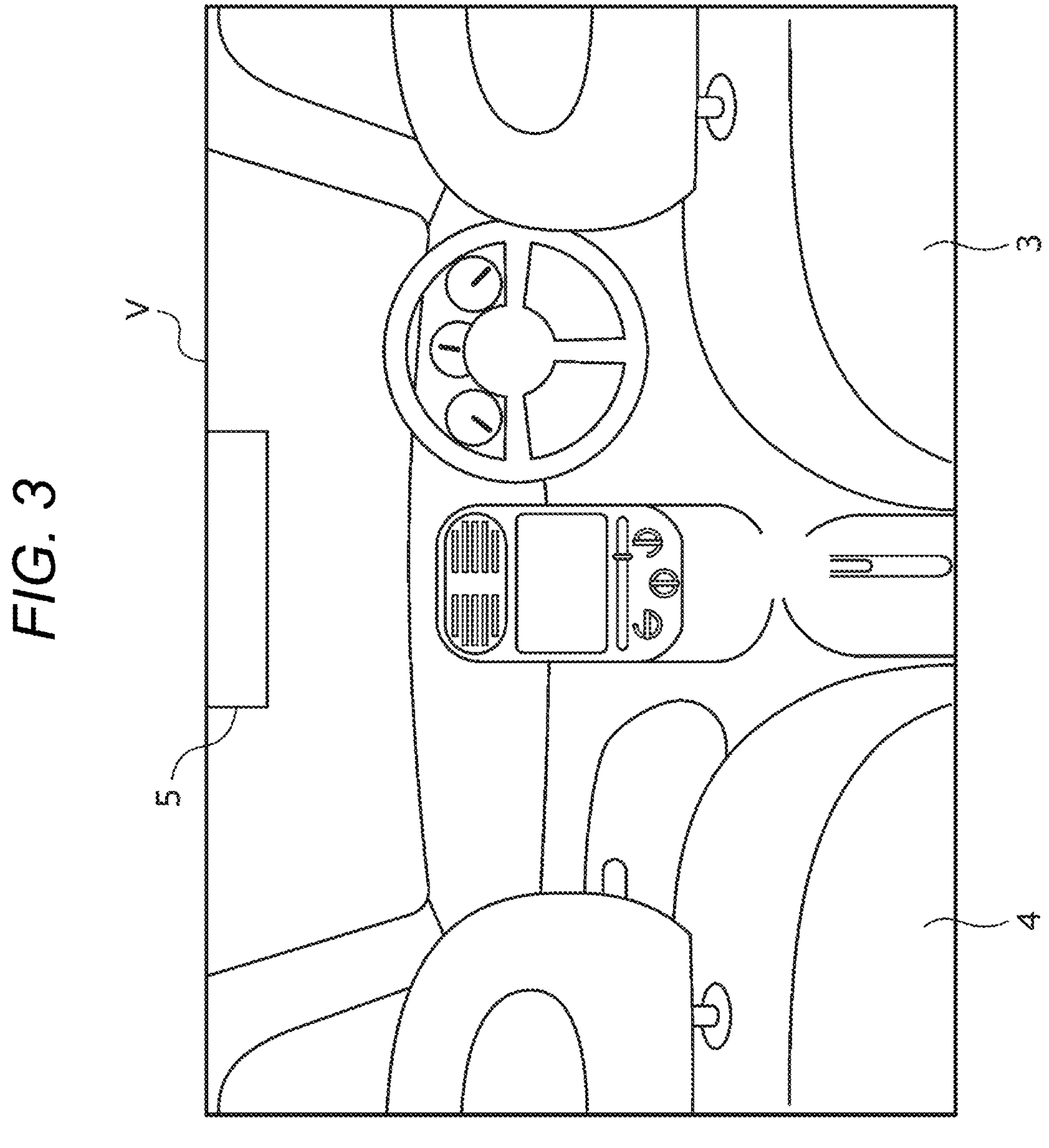
FIG. 3 is another example of the vehicle, and is a schematic diagram of a cabin of the vehicle on which a vehicular camera is mounted.
Figure 4:
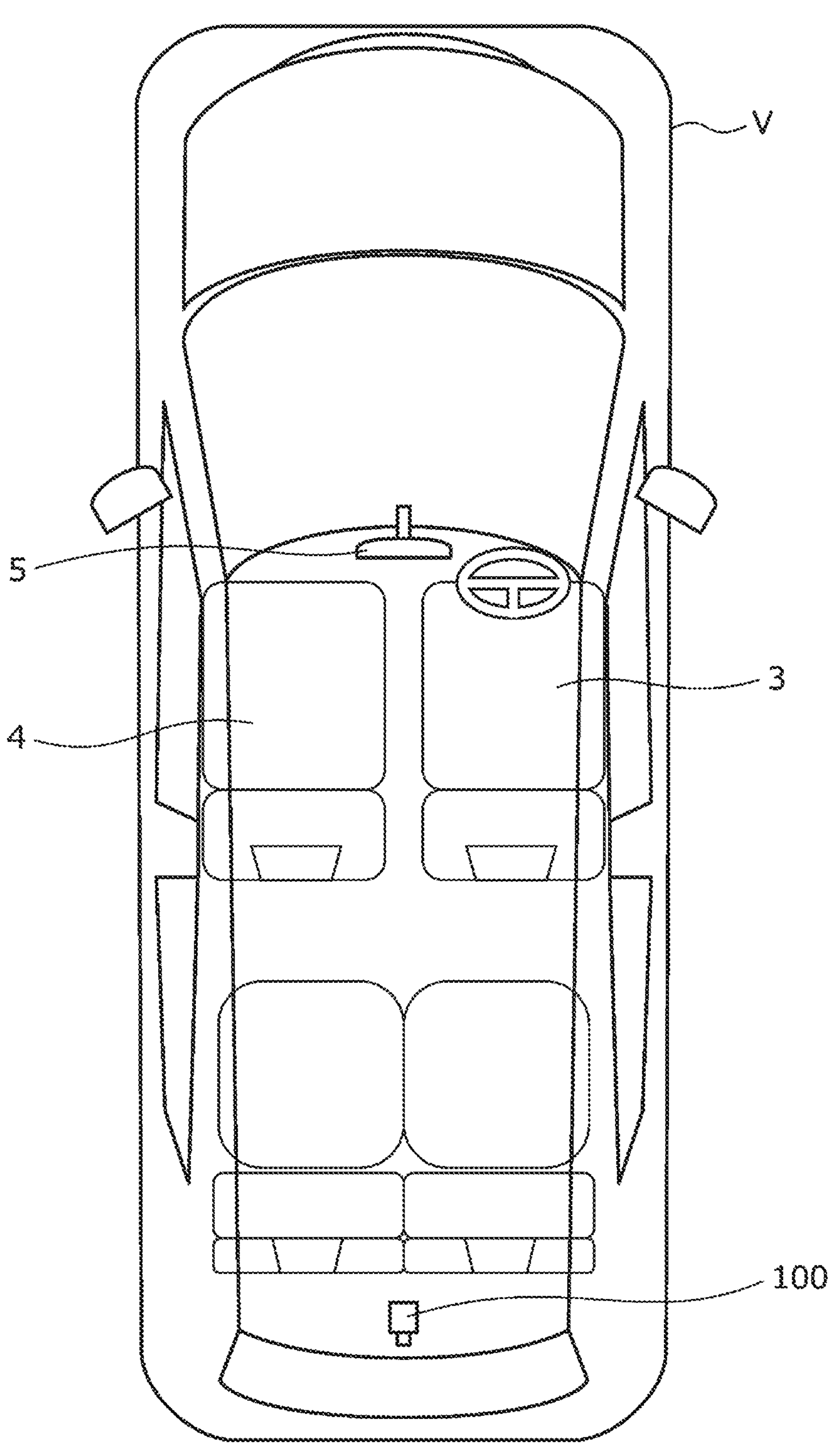
FIG. 4 is a top view of the vehicle in FIG. 3.
Figure 5:
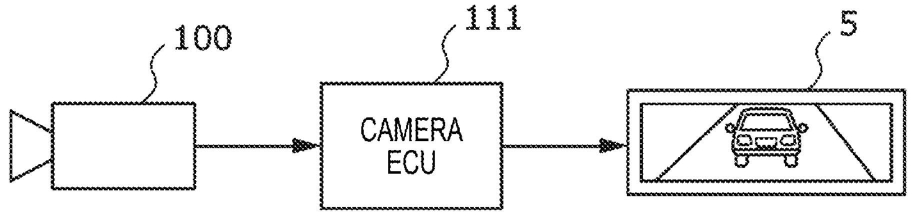
FIG. 5 is a block diagram illustrating a connection example of the vehicular camera provided in the vehicle shown in FIG. 3, a camera ECU, and a display device.

FIG. 3 is another example of the vehicle, and is a schematic diagram of a cabin of the vehicle on which the vehicular camera is mounted, and FIG. 4 is a top view of the vehicle in FIG. 3. The vehicle V includes a display device 5 (for example, an electronic rearview mirror) at an attachment position of a rearview mirror which is a front portion between a driver's seat 3 and a passenger seat 4 in a cabin 2. Further, the vehicle V is provided with the vehicular camera 100 at a rear side of a vehicle body. FIG. 5 is a block diagram illustrating a connection example of the vehicular camera 100 provided in the vehicle V shown in FIG. 3, a camera ECU 111, and the display device 5. The camera electronic control unit (ECU) 111 in FIG. 4 processes an image captured by the vehicular camera 100, and the display device 5 displays the image. The occupant can visually recognize the display device 5 and check a rear situation of the vehicle V.

(Embodiment of Vehicular Camera)

Figure 6:
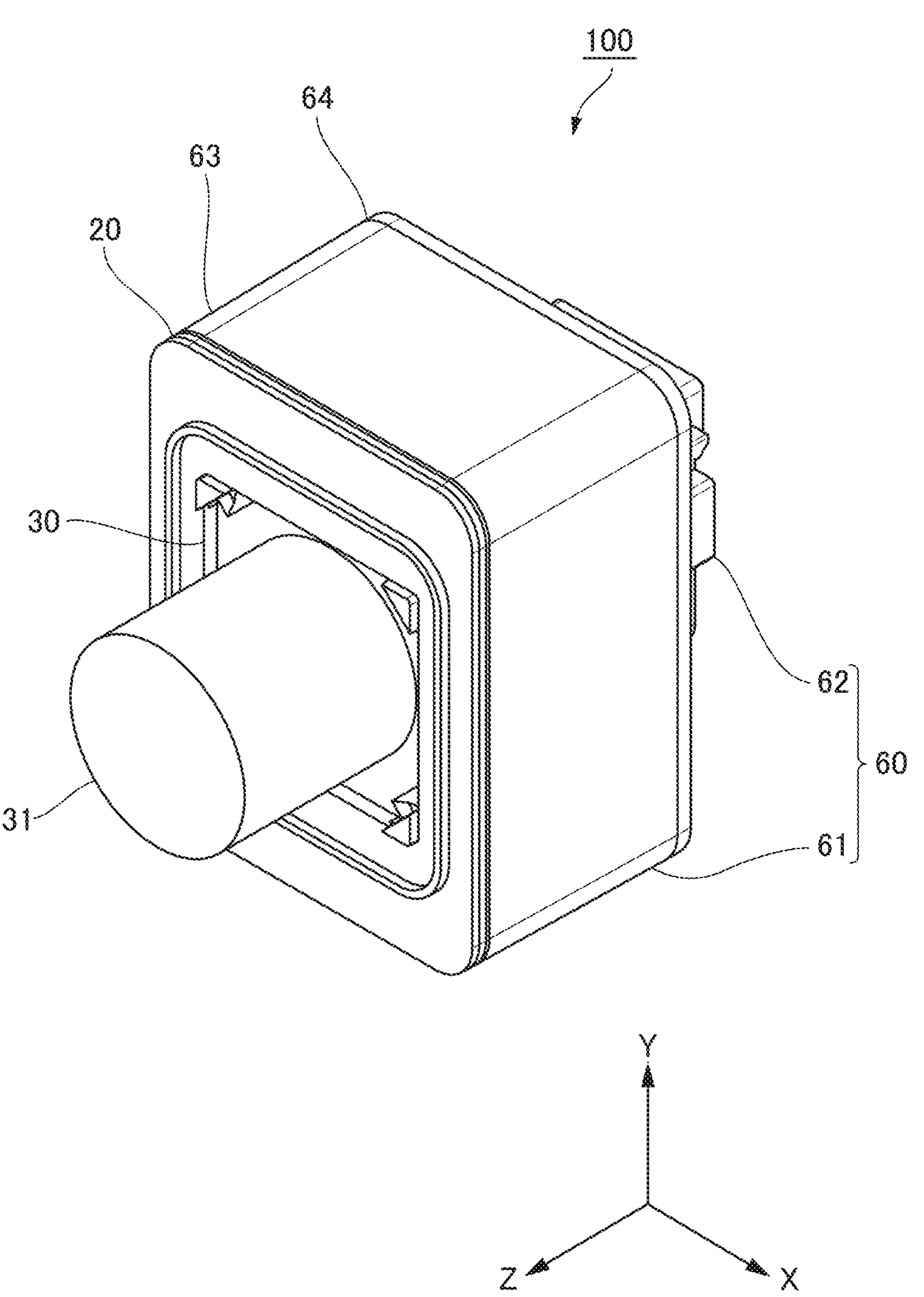
FIG. 6 is a front perspective view of the vehicular camera according to an embodiment.
Figure 7:
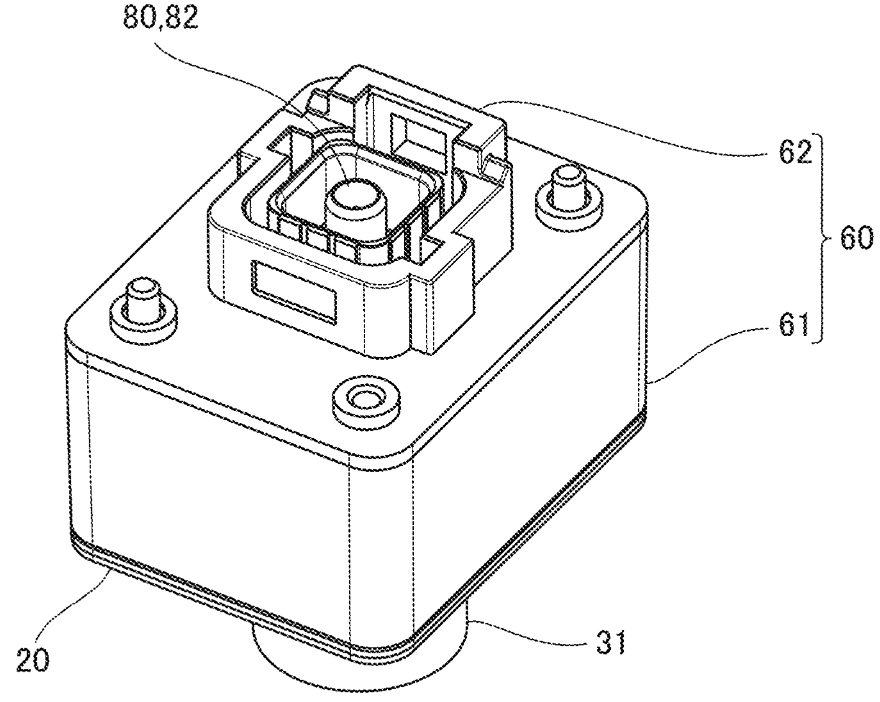
FIG. 7 is a rear perspective view of the vehicular camera according to the embodiment.
Figure 7:
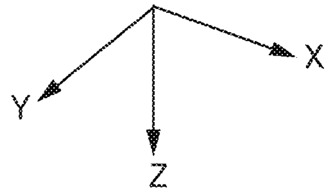
Figure 8:
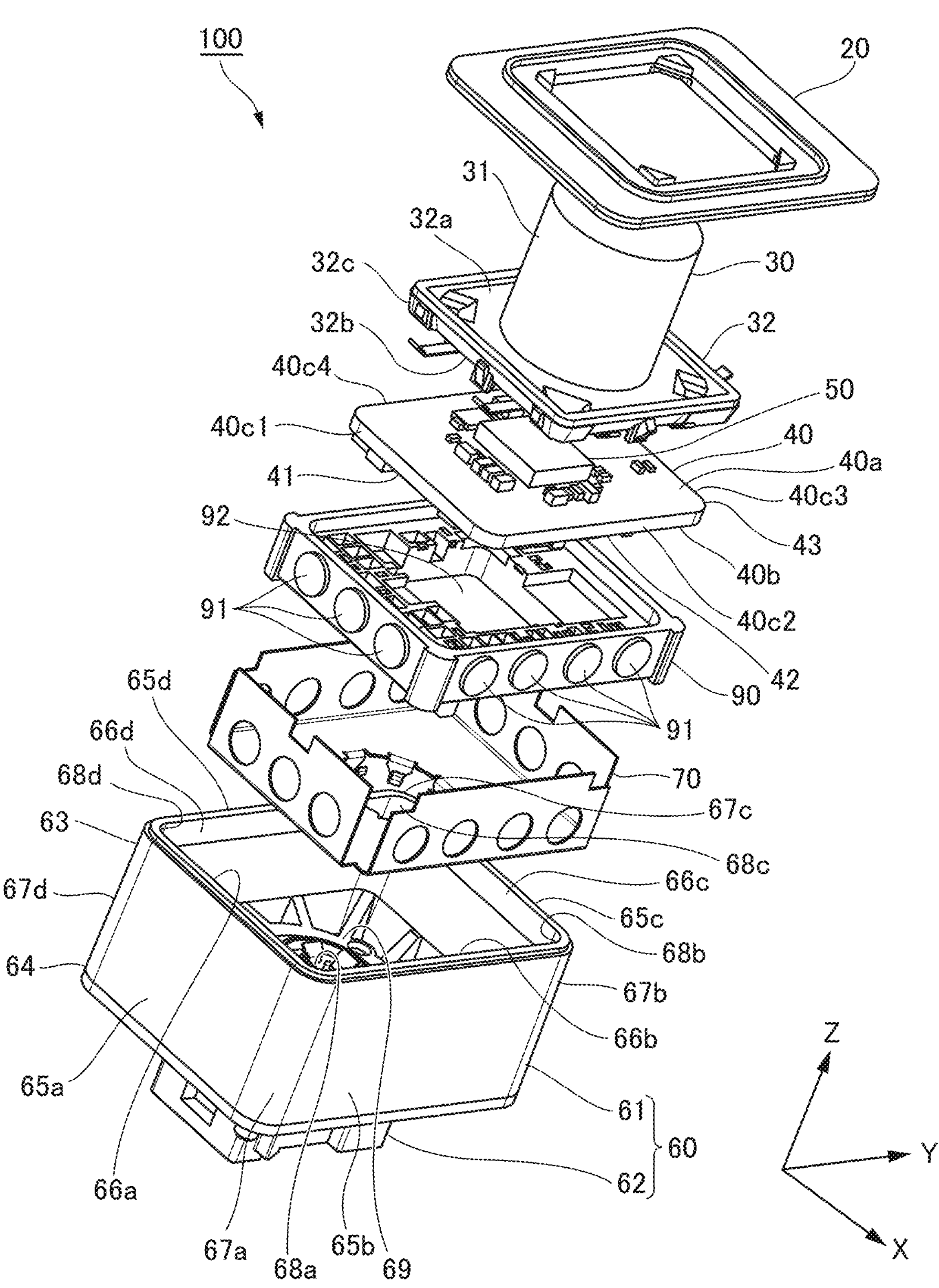
FIG. 8 is an exploded perspective view of the vehicular camera according to the embodiment.
Figure 9:
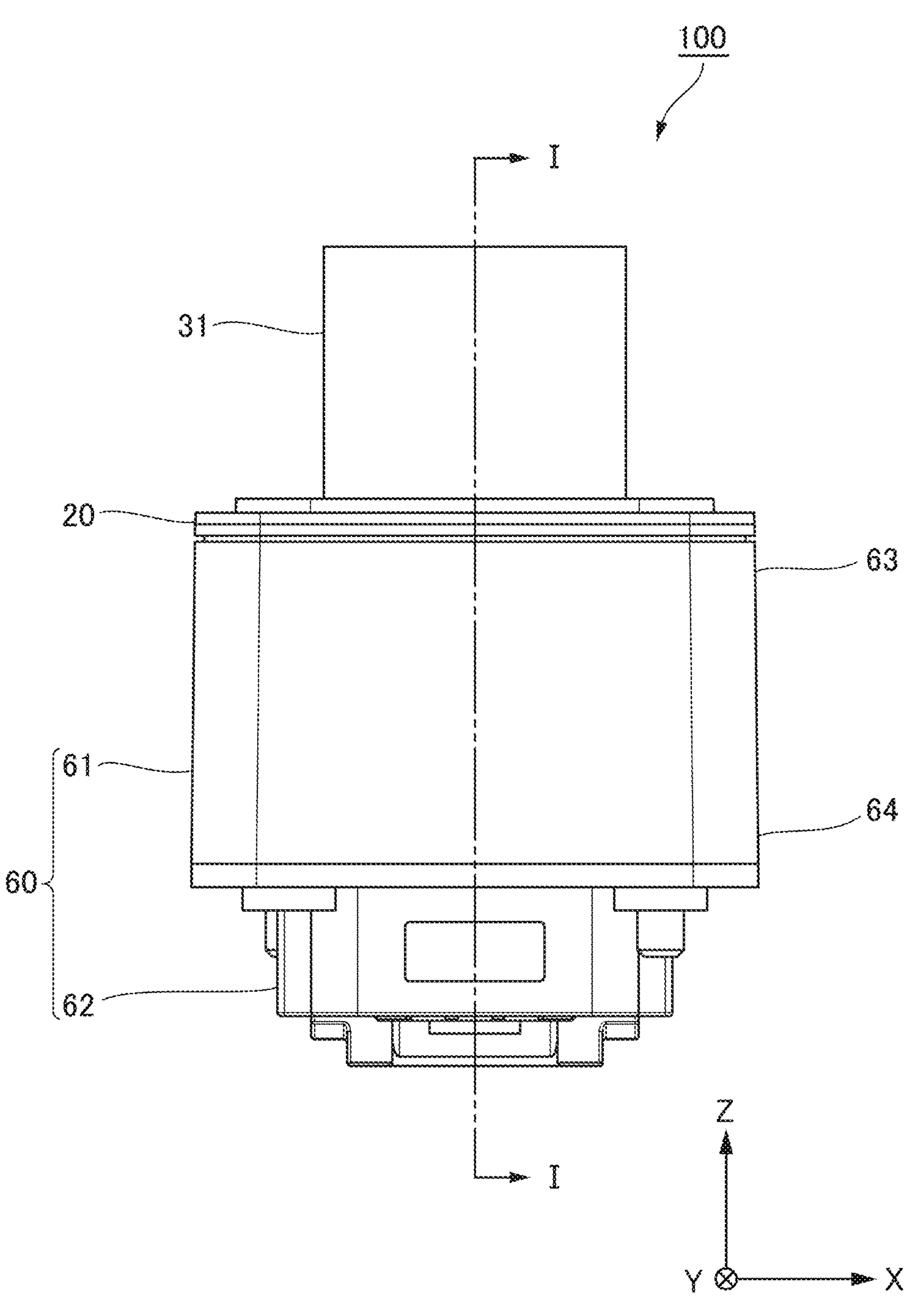
FIG. 9 is a side view of the vehicular camera according to the embodiment.
Figure 10:
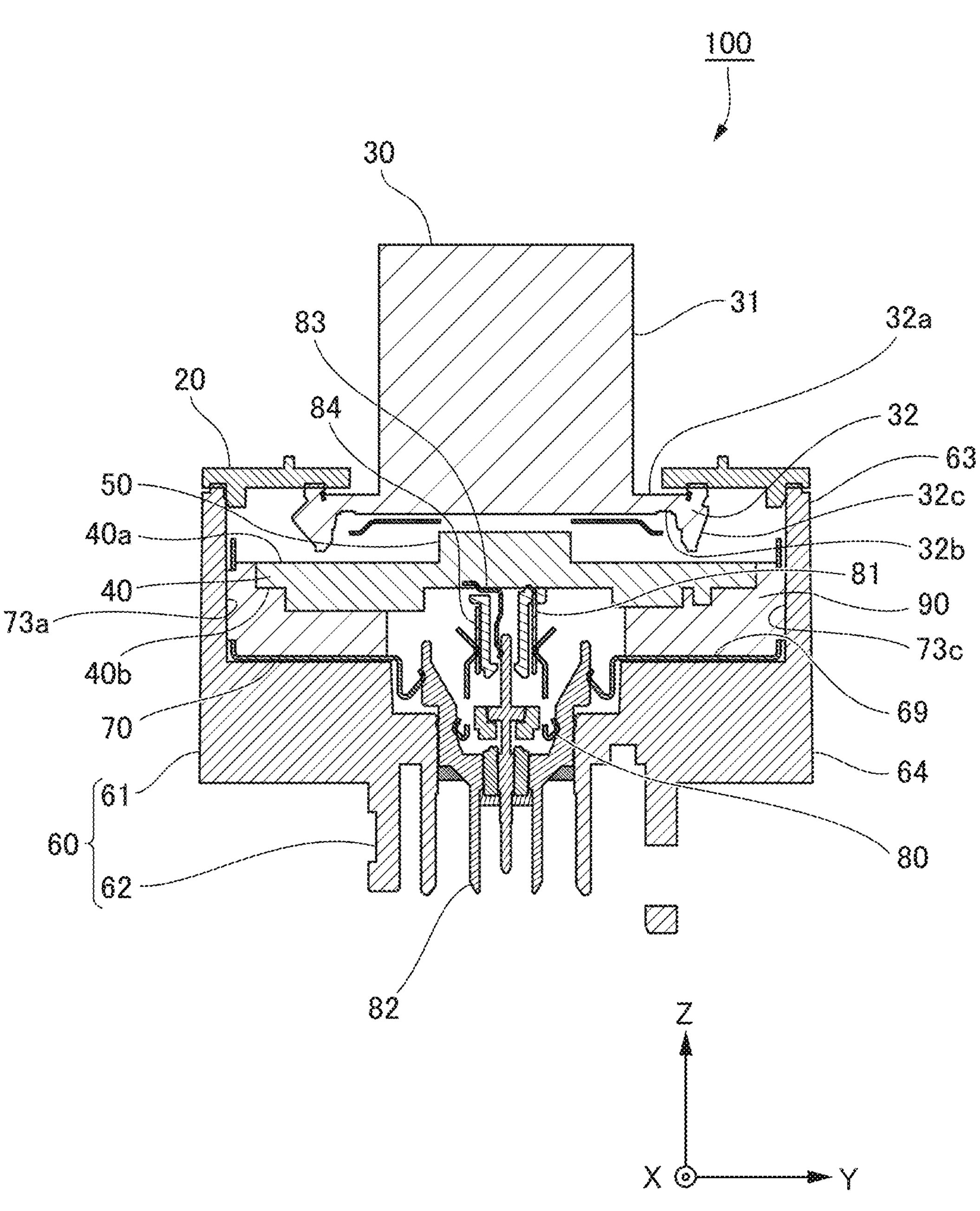
FIG. 10 is a cross-sectional view taken along a line I-I in FIG. 9.
Figure 11:
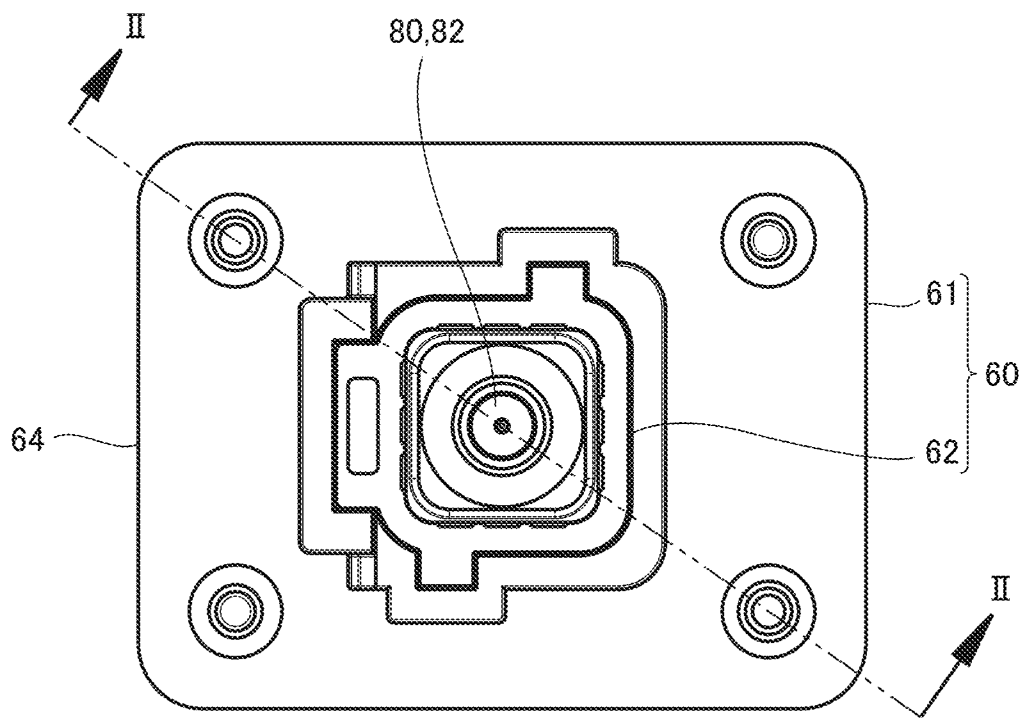
FIG. 11 is a bottom view of the vehicular camera according to the embodiment.
Figure 11:
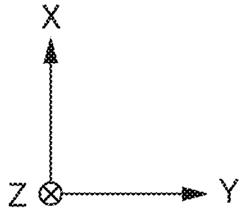
Figure 12:
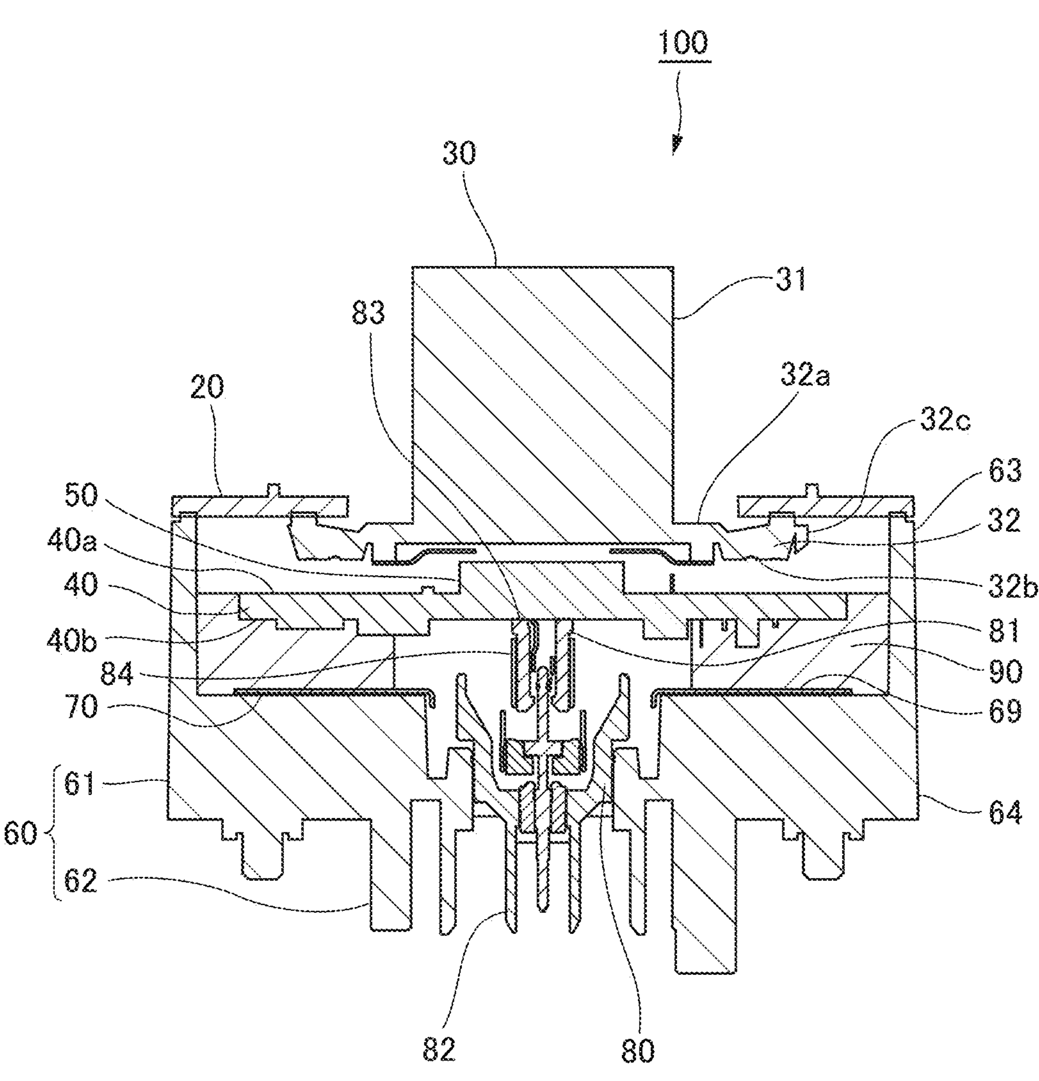
FIG. 12 is a cross-sectional view taken along a line II-II in FIG. 11.

FIG. 6 is a front perspective view of the vehicular camera 100 according to an embodiment. FIG. 7 is a rear perspective view of the vehicular camera 100 according to the embodiment. FIG. 8 is an exploded perspective view of the vehicular camera 100 according to the embodiment. FIG. 9 is a side view of the vehicular camera 100 according to the embodiment. FIG. 10 is a cross-sectional view taken along a line I-I in FIG. 9. FIG. 11 is a bottom view of the vehicular camera 100 according to the embodiment. FIG. 12 is a cross-sectional view taken along a line II-II in FIG. 11. Coordinates including an X axis along one side of the vehicular camera 100, a Y axis orthogonal to the X axis and along another side of the vehicular camera 100, and a Z axis orthogonal to the X axis and the Y axis and along a height direction of the vehicular camera 100 are defined, and are used in the following description.

The vehicular camera 100 according to the present embodiment includes a ring member 20, a lens unit 30, a circuit board 40, an imaging element 50, a housing 60, a conductive member 70, and a resin member 90.

The ring member 20 is implemented by a rectangular annular member having a flat plate shape in a plan view, and is welded to the lens unit 30 and the housing 60 by laser welding. An inner peripheral surface of the ring member 20 faces an outer peripheral surface of a first tubular portion 31 (to be described below) that constitutes a lens barrel of the lens unit 30. An inner diameter of the ring member 20 has a length that allows the first tubular portion 31 of the lens unit 30 to be inserted.

The ring member 20 can be formed of a first resin. Accordingly, the ring member 20 can be easily formed at low cost.

The lens unit 30 includes a first tubular portion 31 constituting a tubular lens barrel, and at least one lens that is accommodated inside the first tubular portion 31 and arranged on an optical axis L (an axis extending in a direction perpendicular to a paper surface of FIG. 11 and along the Z axis). The first tubular portion 31 has a tubular shape, and holds therein, for example, a lens group including a plurality of lenses. The respective lenses in the lens group are arranged in a state in which respective optical axes L are aligned with each other, and constitute the lens group used for capturing images of the inside and outside of the vehicle body of the vehicle V.

Further, the lens unit 30 has a flange portion 32 disposed outside the first tubular portion 31 to extend outward with reference to the optical axis L over an entire circumference centering on the optical axis L. The flange portion 32 has a first flange surface 32*a* facing the ring member 20, a second flange surface 32*b* opposite to the first flange surface 32*a* and located in an internal space of a large-diameter tubular portion 61 of the housing 60 to be described later, and a flange end surface 32*c* connecting the first flange surface 32*a* and the second flange surface 32*b*.

At least the flange portion 32 of the lens unit 30 can be formed of a second resin. The lens unit 30 may be entirely formed of the second resin. Accordingly, the lens unit 30 can be easily formed at low cost.

The circuit board 40 is disposed in the internal space of the housing 60, and includes a first surface 40*a* and a second surface 40*b* opposite to the first surface 40*a*. However, two or more circuit boards may be provided.

The circuit board 40 has at least a fifth side 41, a sixth side 42, a seventh side 43, and an eighth side 44 in a plan view of the circuit board 40 (a shape viewed in a direction of the optical axis L, that is, a direction along the Z axis, the same applies hereinafter). The circuit board 40 has, for example, a quadrilateral shape. The circuit board 40 includes at least a first end surface 40*c*1 corresponding to the fifth side 41, a second end surface 40*c*2 corresponding to the sixth side 42, a third end surface 40*c*3 corresponding to the seventh side 43, and a fourth end surface 40*c*4 corresponding to the eighth side 44, which are located between the first surface 40*a* and the second surface 40*b*.

The imaging element 50 is disposed on the first surface 40*a* of the circuit board 40 and on the optical axis L of at least one lens of the lens unit 30. The imaging element 50 is electrically connected to a circuit of the circuit board 40, and can capture an image by directing external light to the imaging element 50.

The conductive member 70 is disposed to accommodate the circuit board 40 and the imaging element 50 in the internal space of the housing 60. The conductive member 70 serves to shield electromagnetic wave noise coming from the outside of the housing 60 and electromagnetic wave noise to be radiated in the internal space. The conductive member 70 may be made of, for example, metal or may be a resin member having conductivity.

The housing 60 is a tubular member having the internal space, and serves to support the lens unit 30 and accommodate at least the circuit board 40, the imaging element 50, and the conductive member 70. The housing 60 has the large-diameter tubular portion 61 having a second tubular shape along the optical axis L, and a small-diameter tubular portion 62 along the optical axis L. The large-diameter tubular portion 61 constituting a second tubular portion has a larger cross-sectional area than the small-diameter tubular portion 62, and has a rectangular cross section. The large-diameter tubular portion 61 accommodates at least the circuit board 40, the imaging element 50, and the conductive member 70 therein. The small-diameter tubular portion 62 mainly accommodates a connector 80 that secures electrical connection with the outside of the vehicular camera 100 (to be described below). The large-diameter tubular portion 61 and the small-diameter tubular portion 62 may be integrally formed of a resin to be described later, and the large-diameter tubular portion 61 and the small-diameter tubular portion 62 prepared individually in advance may be joined by a method such as welding or screwing. In the present embodiment, the housing 60 has a rectangular tubular shape, but is not limited thereto, and may have a triangular tubular shape or a polygonal tubular shape having pentagon or more sides other than the rectangular tubular shape, a circular or elliptical tubular shape, or another tubular shape.

The large-diameter tubular portion 61 of the housing 60 includes a first wall 65*a*, a second wall 65*b*, a third wall 65*c*, and a fourth wall 65*d*. A first inner side surface 66*a* corresponds to an inner surface of the first wall 65*a*, a second inner side surface 66*b* corresponds to an inner surface of the second wall 65*b*, a third inner side surface 66*c* corresponds to an inner surface of the third wall 65*c*, and a fourth inner side surface 66*d* corresponds to an inner surface of the fourth wall 65*d*.

Further, the large-diameter tubular portion 61 includes a first housing end portion 63 disposed between the first tubular portion 31 of the lens unit 30 and the circuit board 40, and a second housing end portion 64 that is opposite to the first housing end portion 63 in a first direction, which is a direction along the optical axis L, and at least partially faces the second surface 40*b* of the circuit board 40.

At least the first housing end portion 63 of the housing 60 can be formed of a third resin. The housing 60 may be entirely formed of the third resin. Accordingly, the housing 60 can be easily formed at low cost.

The conductive member 70 will be described again. The conductive member 70 includes a bottom surface portion 71 having a flat plate shape. The bottom surface portion 71 at least partially faces the second surface 40*b* of the circuit board 40, is disposed at the second housing end portion 64 of the housing 60, and has a first shape including at least a first side 71*a*, a second side 71*b*, a third side 71*c*, and a fourth side 71*d* in a plan view of the conductive member 70. The conductive member 70 further includes a first planar portion 72*a*, a second planar portion 72*b*, a third planar portion 72*c*, and a fourth planar portion 72*d* each extending like a wall from the bottom surface portion 71.

The first planar portion 72*a* extends from the first side 71*a* of the bottom surface portion 71 in a second direction, which is a direction away from the second housing end portion 64 of the housing 60, and is disposed along the first inner side surface 66*a* of the large-diameter tubular portion 61 of the housing 60. The second planar portion 72*b* extends in the second direction from the second side 71*b* of the bottom surface portion 71, and is disposed along the second inner side surface 66*b* of the large-diameter tubular portion 61 of the housing 60. The third planar portion 72*c* extends in the second direction from the third side 71*c* of the bottom surface portion 71, and is disposed along the third inner side surface 66*c* of the large-diameter tubular portion 61 of the housing 60. The fourth planar portion 72*d* extends in the second direction from the fourth side 71*d* of the bottom surface portion 71, and is disposed along the fourth inner side surface 66*d* of the large-diameter tubular portion 61 of the housing 60.

The conductive member 70 further includes at least one first hole 73*a* penetrating the first planar portion 72*a*, at least one second hole 73*b* penetrating the second planar portion 72*b*, at least one third hole 73*c* penetrating the third planar portion 72*c*, and at least one fourth hole 73*d* penetrating the fourth planar portion 72*d*.

The resin member 90 is a member formed of resin having predetermined thermal conductivity, and is disposed at least between the second surface 40*b* of the circuit board 40 and the bottom surface portion 71 of the conductive member 70. The resin member 90 is formed of, for example, silicone resin.

The resin member 90 is brought into contact with the first inner side surface 66*a* of the large-diameter tubular portion 61 of the housing 60 through the first hole 73*a* of the first planar portion 72*a* of the conductive member 70. The resin member 90 is brought into contact with the second inner side surface 66*b* of the large-diameter tubular portion 61 of the housing 60 through the second hole 73*b* of the second planar portion 72*b* of the conductive member 70. The resin member 90 is brought into contact with the third inner side surface 66*c* of the large-diameter tubular portion 61 of the housing 60 through the third hole 73*c* of the third planar portion 72*c* of the conductive member 70. The resin member 90 is brought into contact with the fourth inner side surface 66*d* of the large-diameter tubular portion 61 of the housing 60 through the fourth hole 73*d* of the fourth planar portion 72*d* of the conductive member 70.

The resin member 90 is a gel-like member that is solid but has predetermined fluidity. When the vehicular camera 100 is assembled, after the resin member 90 is disposed on the bottom surface portion 71 of the conductive member 70, members such as the circuit board 40 are disposed on an upper surface thereof, thereby deforming the resin member 90 by applying pressure from above. The resin member 90 is deformed to spread outward in a radial direction orthogonal to the optical axis L, and when the resin member 90 reaches the first planar portion 72*a*, the second planar portion 72*b*, the third planar portion 72*c*, and the fourth planar portion 72*d*, the resin member 90 protrudes from the first hole 73*a*, the second hole 73*b*, the third hole 73*c*, and the fourth hole 73*d*. The protruding portion becomes a protrusion 91 (see FIG. 8), and the protrusion 91 is brought into contact with the first inner side surface 66*a*, the second inner side surface 66*b*, the third inner side surface 66*c*, and the fourth inner side surface 66*d* of the large-diameter tubular portion 61 of the housing 60. Although FIG. 8 is an exploded perspective view before assembly, the resin member 90 does not have a shape before assembly but has a shape after deformation, and the protrusion 91 does not exist before actual assembly. A through hole 92 is formed in advance in a bottom surface of the resin member 90 before assembly, and a predetermined opening area is secured even after the resin member 90 is deformed.

Since the vehicular camera 100 processes a large amount of data, components such as the circuit board 40 generate heat. It is important to efficiently release the heat. In the vehicular camera 100 according to the present embodiment, since the resin member 90 is brought into contact with the inner side surfaces (the first inner side surface 66*a* to the fourth inner side surface 66*d*) of the housing 60 through the holes (the first hole 73*a* to the fourth hole 73*d*) of the conductive member 70, heat generated inside the housing 60 can be efficiently dissipated.

However, the conductive member 70 originally serves to shield electromagnetic wave noise inside and outside the housing 60 by a shielding effect. Providing the hole in the conductive member 70 may weaken the shielding effect. However, since a size of the hole through which the electromagnetic wave noise can pass can be predicted, it is possible to prevent noise from passing through the hole and thus prevent a decrease in shielding performance by appropriately designing the hole in consideration of the shielding effect of the noise. Further, the capacitive coupling between the electromagnetic wave noise generated from the circuit board 40 and the conductive member 70 via the resin member 90 is reduced by the holes (the first hole 73*a* to the fourth hole 73*d*) of the conductive member 70. Thus, the electromagnetic wave noise from the circuit board 40, which is capacitively coupled to the conductive member 70, can be prevented from being transmitted to the connector 80. The first hole 73*a*, the second hole 73*b*, the third hole 73*c*, and the fourth hole 73*d* may have the same shape and the same size. The shape of the first hole 73*a*, the second hole 73*b*, the third hole 73*c*, and the fourth hole 73*d* may be, for example, a triangle, a rectangle, a polygon having pentagons or more sides, or a circle. The circle may include an ellipse.

The first hole 73*a* has a first hole shape, the second hole 73*b* has a second hole shape, the third hole 73*c* has a third hole shape, and the fourth hole 73*d* has a fourth hole shape. The hole of the conductive member 70 can be freely designed. The shape of the first to fourth holes may be, for example, a triangle, a rectangle, a polygon having pentagons or more sides, or a circle. The circle may include an ellipse.

In particular, in the embodiment, the first hole shape of the first hole 73*a*, the second hole shape of the second hole 73*b*, the third hole shape of the third hole 73*c*, and the fourth hole shape of the fourth hole 73*d* are circular. Accordingly, the holes of the conductive member 70 can be easily formed.

Furthermore, in the embodiment, a plurality of first holes 73*a* penetrate the first planar portion 72*a* of the conductive member 70, a plurality of second holes 73*b* penetrate the second planar portion 72*b* of the conductive member 70, a plurality of third holes 73*c* penetrate the third planar portion 72*c* of the conductive member 70, and a plurality of fourth holes 73*d* penetrate the fourth planar portion 72*d* of the conductive member 70. Accordingly, since the resin member 90 penetrates the plurality of holes in each planar portion of the conductive member 70, a heat dissipation effect by the resin member 90 is improved.

As in the embodiment, three or more first holes 73*a* arranged at equal intervals may penetrate the first planar portion 72*a*, three or more second holes 73*b* arranged at equal intervals may penetrate the second planar portion 72*b*, three or more third holes 73*c* arranged at equal intervals may penetrate the third planar portion 72*c*, and three or more fourth holes 73*d* arranged at equal intervals may penetrate the fourth planar portion 72*d*.

The conductive member 70 further includes at least one fifth hole 73*e* penetrating the bottom surface portion 71. Accordingly, a member such as a connector can be connected to the circuit board 40 through the fifth hole 73*e*.

Regarding the design of the holes described above, a maximum inner diameter of each of the first hole 73*a*, the second hole 73*b*, the third hole 73*c*, and the fourth hole 73*d* can be set to be smaller than, for example, half a wavelength of an upper limit frequency of an Electromagnetic Compatibility (EMC) standard. Accordingly, it is possible to effectively prevent the electromagnetic wave noise from passing through the hole and prevent a decrease in EMC which is a performance index of the shielding effect.

The resin member 90 may further be brought into contact with at least a part of the second surface 40*b* of the circuit board 40, at least a part of the first planar portion 72*a* of the conductive member 70, at least a part of the second planar portion 72*b* of the conductive member 70, at least a part of the third planar portion 72*c* of the conductive member 70, at least a part of the fourth planar portion 72*d* of the conductive member 70, and at least a part of the bottom surface portion 71 of the conductive member 70. Accordingly, since the resin member 90 is brought into contact with the circuit board 40 and the conductive member 70, the heat generated in the circuit board 40 can be efficiently dissipated.

Returning to the circuit board 40, the circuit board 40 has a second shape including at least a fifth side 41, a sixth side 42, a seventh side 43, and an eighth side 44 in a plan view of the circuit board 40. The circuit board 40 includes at least a first end surface 40*c*1 corresponding to the fifth side 41, a second end surface 40*c*2 corresponding to the sixth side 42, a third end surface 40*c*3 corresponding to the seventh side 43, and a fourth end surface 40*c*4 corresponding to the eighth side 44.

At least a part of the first planar portion 72*a* of the conductive member 70 faces the first end surface 40*cl* of the circuit board 40, at least a part of the second planar portion 72*b* faces the second end surface 40*c*2 of the circuit board

40, at least a part of the third planar portion 72*c* faces the third end surface 40*c*3 of the circuit board 40, and at least a part of the fourth planar portion 72*d* faces the fourth end surface 40*c*4 of the circuit board 40. The resin member 90 is further brought into contact with at least a part of the first end surface 40*c*1 of the circuit board 40, at least a part of the second end surface 40*c*2 of the circuit board 40, at least a part of the third end surface 40*c*3 of the circuit board 40, and at least a part of the fourth end surface 40*c*4 of the circuit board 40. Accordingly, since the resin member 90 is brought into contact with the end surface of the circuit board 40, the heat generated in the circuit board 40 can be efficiently dissipated. Even if there is another member such as the resin member 90 between each end surface of the circuit board 40 and each planar portion of the conductive member 70, it is interpreted as facing each other.

At least a part of an interface of the resin member 90 may be located between the first surface 40*a* of the circuit board 40 and the second surface 40*b* of the circuit board 40 in the first direction. That is, the upper surface of the resin member 90 may be located in the middle of each end surface of the circuit board 40. Accordingly, since the resin member 90 is brought into contact with the end surface of the circuit board 40, the heat generated in the circuit board 40 can be efficiently dissipated.

Figure 13A:
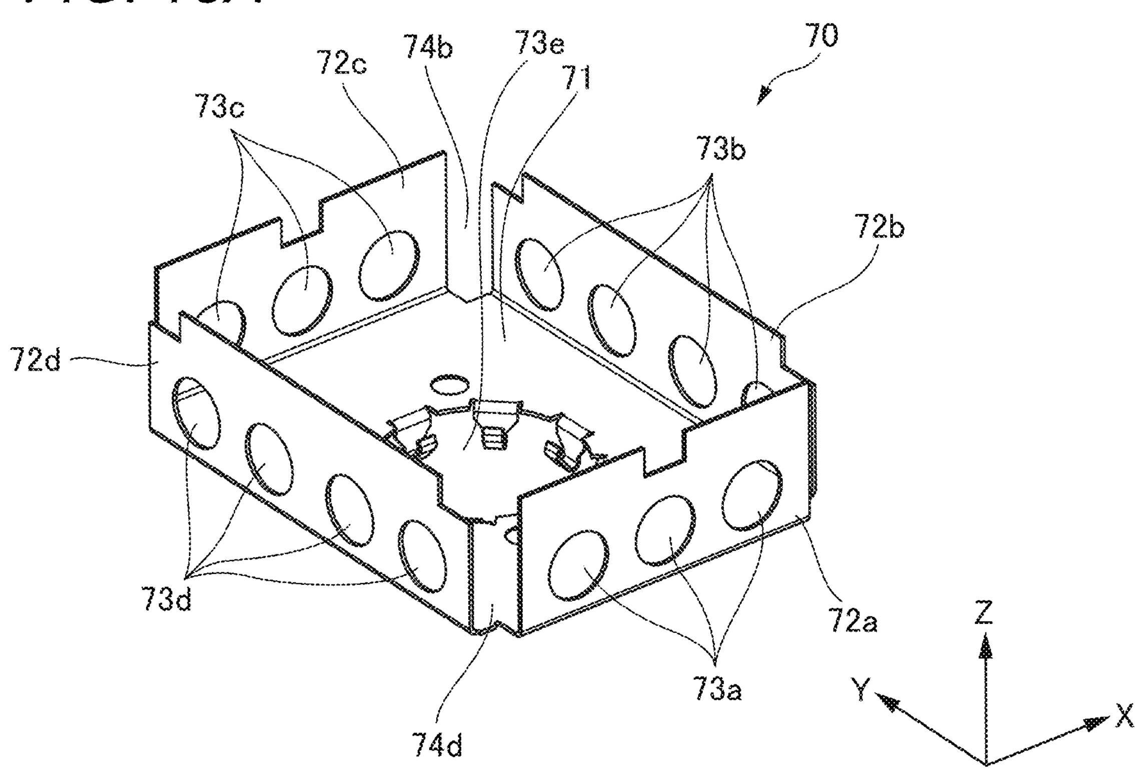
FIG. 13A is a top perspective view of a conductive member according to a first example.
Figure 13B:
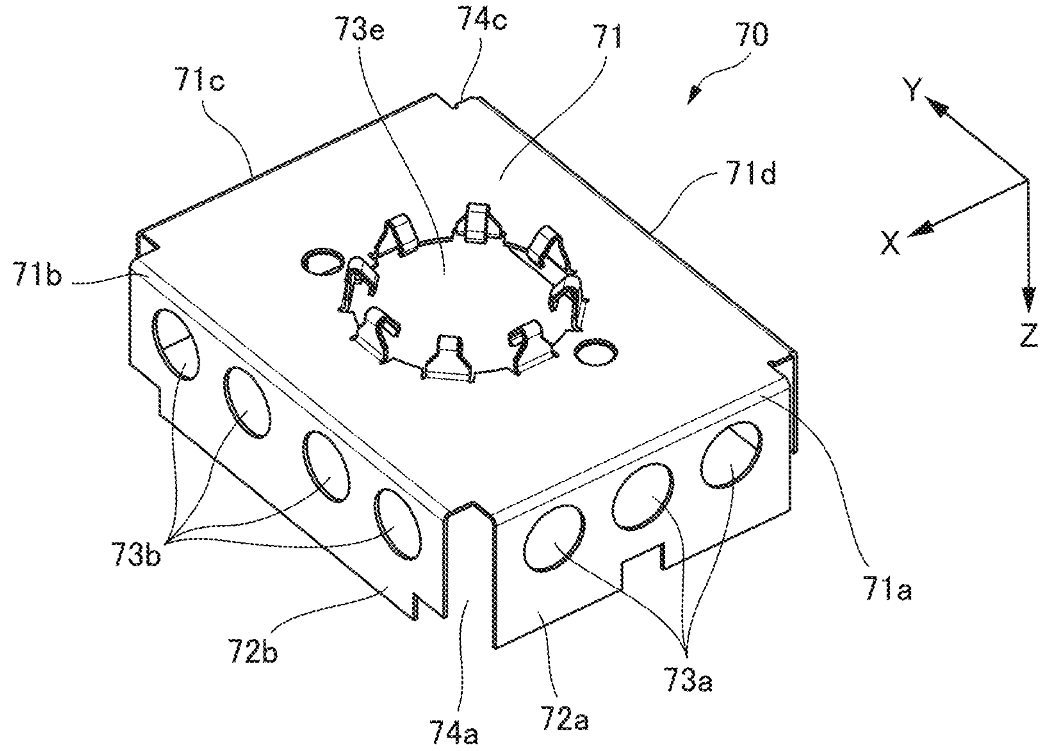
FIG. 13B is a bottom perspective view of the conductive member according to the first example.

FIG. 13A is a top perspective view of the conductive member 70 according to a first example, and FIG. 13B is a bottom perspective view of the conductive member 70 according to the first example. The conductive member 70 according to the first example is the conductive member 70 in the above-described embodiment. In this example, a first gap 74*a* exists between the first planar portion 72*a* and the second planar portion 72*b* of the conductive member 70, a second gap 74*b* exists between the second planar portion 72*b* and the third planar portion 72*c* of the conductive member 70, a third gap 74*c* exists between the third planar portion and the fourth planar portion 72*d* of the conductive member 70, and a fourth gap 74*d* exists between the fourth planar portion 72*d* and the first planar portion 72*a* of the conductive member 70. The resin member 90 is disposed in the first gap 74*a*, the second gap 74*b*, the third gap 74*c*, and the fourth gap 74*d*.

Accordingly, since the resin member 90 is disposed in each gap of the conductive member 70, it is possible to efficiently dissipate the heat generated inside the housing 60.

The conductive member 70 in this example can be formed by bending a single metal plate, for example. Accordingly, the conductive member 70 can be easily formed at low cost.

As described above, the large-diameter tubular portion 61 of the housing 60 includes the first wall 65*a*, the second wall 65*b*, the third wall 65*c*, and the fourth wall 65*d*. The first wall 65*a* of the large-diameter tubular portion 61 corresponds to the first planar portion 72*a* of the conductive member 70. The second wall 65*b* is formed continuously with the first wall 65*a* and corresponds to the second planar portion 72*b* of the conductive member 70. The third wall 65*c* is formed continuously with the second wall 65*b* and corresponds to the third planar portion 72*c* of the conductive member 70. The fourth wall 65*d* is formed continuously with the third wall 65*c* and the first wall 65*a*, and corresponds to the fourth planar portion 72*d* of the conductive member 70.

Further, the large-diameter tubular portion 61 of the housing 60 includes a first housing corner 67*a*, a second housing corner 67*b*, a third housing corner 67*c*, and a fourth housing corner 67*d*. The first housing corner 67*a* is formed between the first wall 65*a* and the second wall 65*b* of the large-diameter tubular portion 61, and has a first corner inner side surface 68*a*. The second housing corner 67*b* is formed between the second wall 65*b* and the third wall 65*c* of the large-diameter tubular portion 61, and has a second corner inner side surface 68*b*. The third housing corner 67*c* is formed between the third wall 65*c* and the fourth wall 65*d* of the large-diameter tubular portion 61, and has a third corner inner side surface 68*c*. The fourth housing corner 67*d* is formed between the fourth wall 65*d* and the first wall 65*a* of the large-diameter tubular portion 61, and has a fourth corner inner side surface 68*d*.

The resin member 90 is further brought into contact with the first corner inner side surface 68*a* of the first housing corner 67*a* of the large-diameter tubular portion 61 through the first gap 74*a* of the conductive member 70, is further brought into contact with the second corner inner side surface 68*b* of the second housing corner 67*b* through the second gap 74*b*, is further brought into contact with the third corner inner side surface 68*c* of the third housing corner 67*c* through the third gap 74*c*, and is further brought into contact with the fourth corner inner side surface 68*d* of the fourth housing corner 67*d* through the fourth gap 74*d*.

With the configuration described above, since the resin member 90 is brought into contact with the corner inner side surfaces of the housing 60 through the gaps of the conductive member 70, the heat generated inside the housing 60 can be more efficiently dissipated.

Figure 14A:
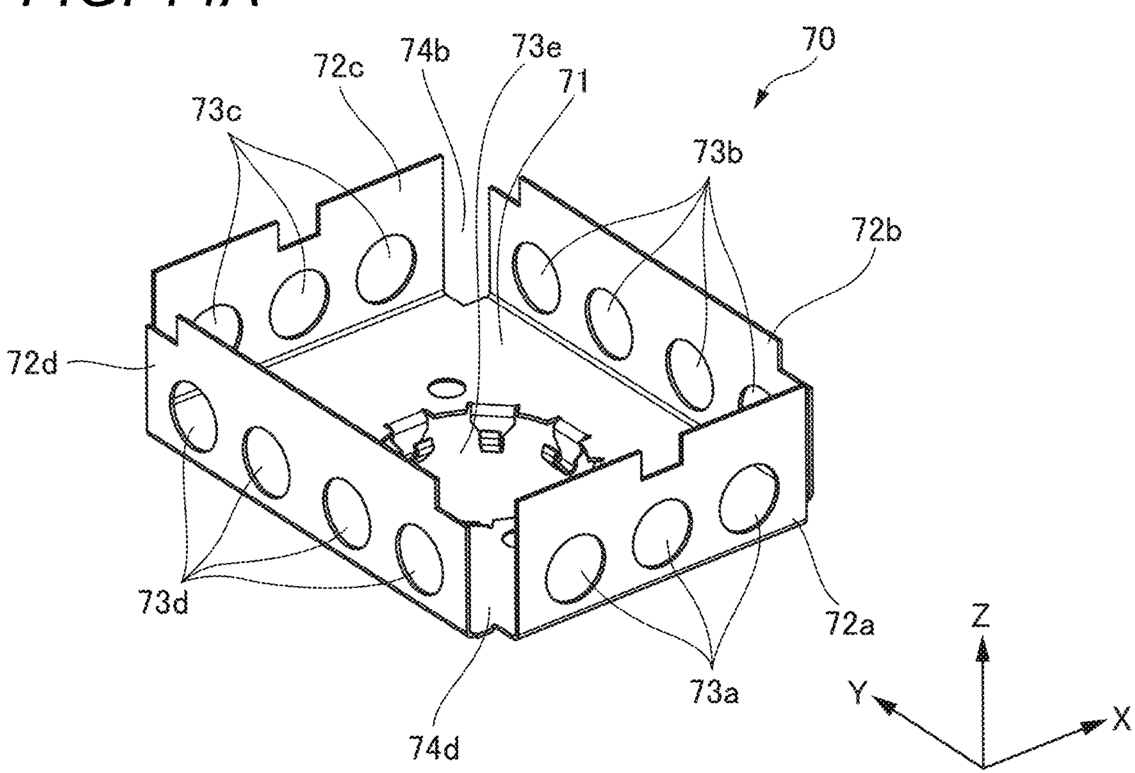
FIG. 14A is a top perspective view of a conductive member according to a second example.
Figure 14B:
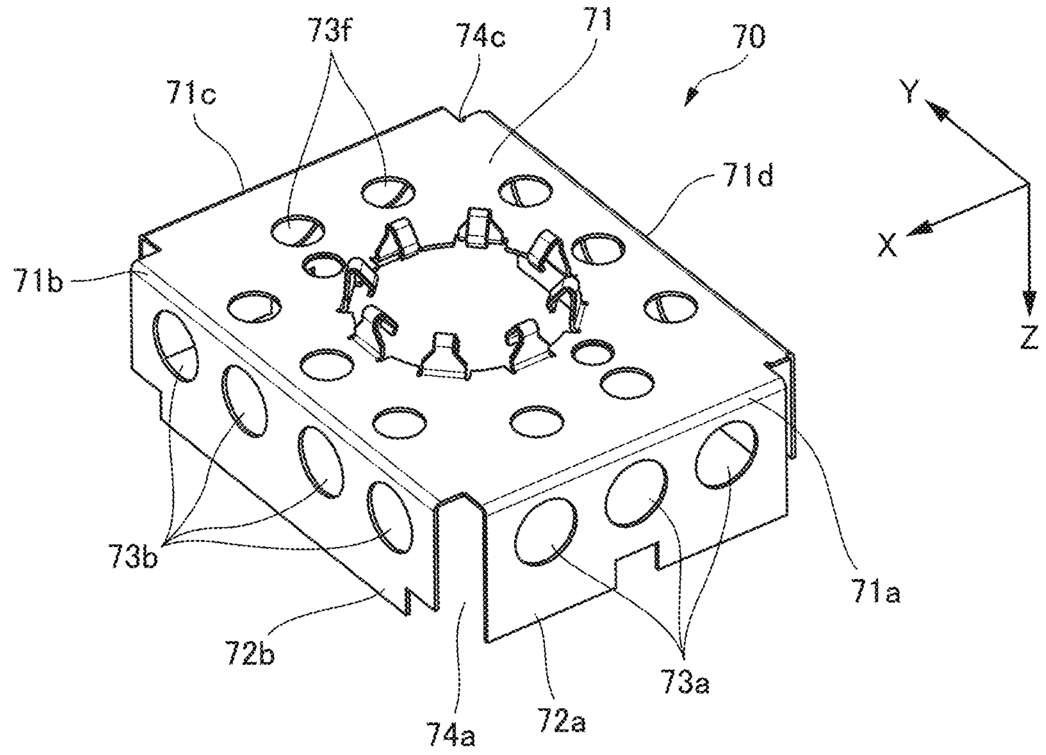
FIG. 14B is a bottom perspective view of the conductive member according to the second example.

FIG. 14A is a top perspective view of the conductive member 70 according to a second example, and FIG. 14B is a bottom perspective view of the conductive member 70 according to the second example. Compared to the conductive member 70 according to the first example, the conductive member 70 according to the second example has, in addition to the fifth hole 73*e*, a plurality of seventh holes 73*f* formed around the fifth hole 73*e* in the bottom surface portion 71.

The second housing end portion 64 of the housing 60 has a housing end surface 69 that faces at least a part of the second surface 40*b* of the circuit board 40. The resin member 90 also protrudes from the seventh holes 73*f* and contacts the housing end surface 69. Thus, the heat generated inside the housing 60 can be more efficiently dissipated.

Figure 15A:
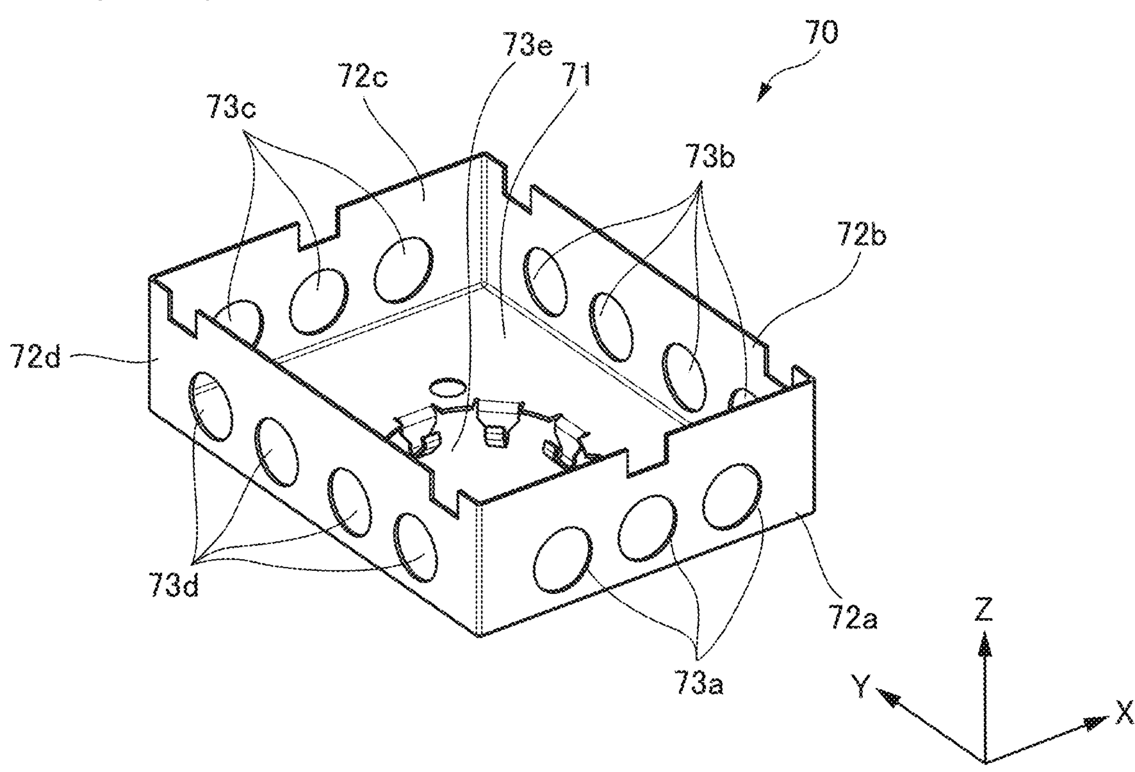
FIG. 15A is a top perspective view of a conductive member according to a third example.
Figure 15B:
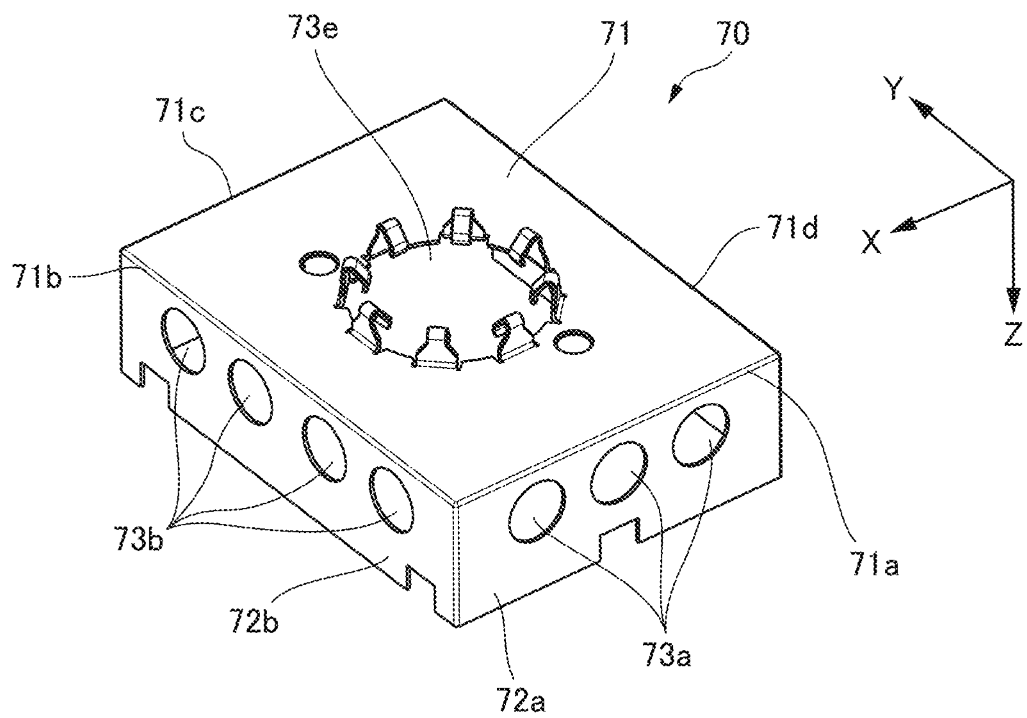
FIG. 15B is a bottom perspective view of the conductive member according to the third example.

FIG. 15A is a top perspective view of the conductive member 70 according to a third example, and FIG. 15B is a bottom perspective view of the conductive member 70 according to the third example. In this example, the first gap 74*a*, the second gap 74*b*, the third gap 74*c*, and the fourth gap 74*d* in the first and second examples do not exist. At least the first planar portion 72*a*, the second planar portion 72*b*, the third planar portion 72*c*, the fourth planar portion 72*d*, and the bottom surface portion 71 of the conductive member 70 are formed to be connected to each other. Accordingly, the conductive member 70 can be easily formed.

In the conductive member 70 according to this example, for example, at least the first planar portion 72*a*, the second planar portion 72*b*, the third planar portion 72*c*, the fourth planar portion 72*d*, and the bottom surface portion can be formed by drawing a single metal plate. Accordingly, the conductive member 70 can be easily formed at low cost.

Figure 16A:
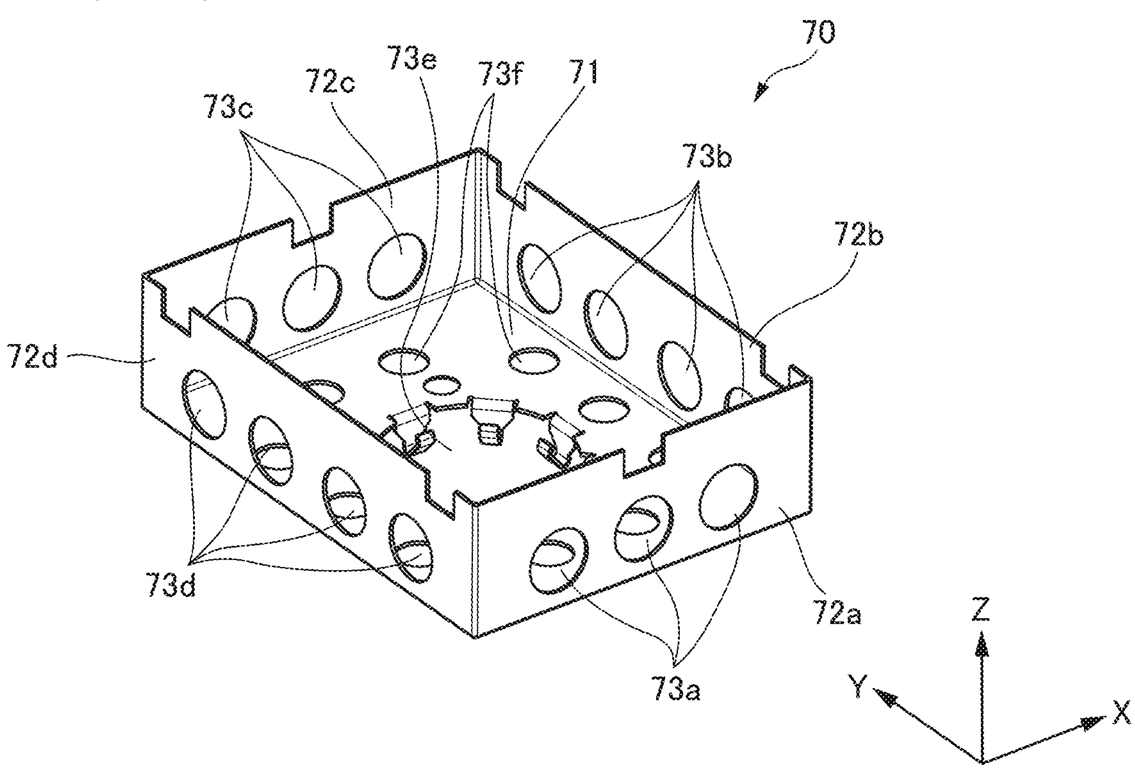
FIG. 16A is a top perspective view of a conductive member according to a fourth example.
Figure 16B:
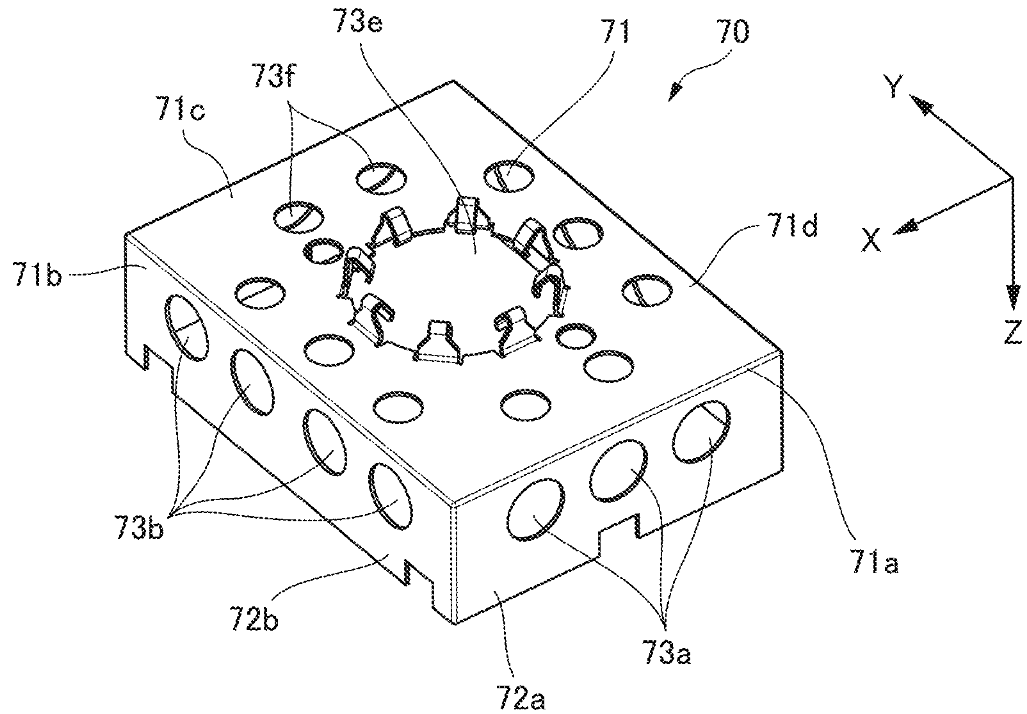
FIG. 16B is a bottom perspective view of the conductive member according to the fourth example.

FIG. 16A is a top perspective view of the conductive member 70 according to a fourth example, and FIG. 16B is a bottom perspective view of the conductive member 70 according to the fourth example. Compared to the conductive member 70 according to the third example, the conductive member 70 according to the fourth example has, in addition to the fifth hole 73*e*, a plurality of seventh holes 73*f* formed around the fifth hole 73_e_ in the bottom surface portion 71. The resin member 90 also protrudes from the seventh holes 73_f_ and contacts the housing end surface 69. Thus, the heat generated inside the housing 60 can be more efficiently dissipated.

As for the housing 60, a sixth hole 69_a_ that penetrates the second housing end portion 64 of the housing 60 in the first direction is formed in the second housing end portion 64 of the housing 60. The second housing end portion 64 of the housing 60 has the housing end surface 69 that faces at least a part of the second surface 40_b_ of the circuit board 40. The bottom surface portion 71 of the conductive member 70 is disposed correspondingly to the housing end surface 69 of the second housing end portion 64 of the housing 60. As shown in FIGS. 10 and 12, the connector 80 is disposed across the inside and outside of the housing 60 through the sixth hole 69_a_ of the second housing end portion 64 of the housing 60 and the fifth hole 73_e_ of the bottom surface portion 71 of the conductive member 70.

The connector 80 includes a first connector end 81 disposed inside the housing 60 and a second connector end 82 opposite to the first connector end 81 and disposed outside the housing 60. The first connector end 81 is electrically connected to the second surface 40_b_ of the circuit board 40, and the second connector end 82 is electrically connected to a wire of the vehicle V when the vehicular camera 100 is disposed in the vehicle V. Accordingly, power supply from the vehicle V and exchange of signals with the vehicle V can be ensured.

The connector 80 may be a coaxial connector having a signal terminal 83 and a ground terminal 84. Accordingly, the power supply from the vehicle V and the exchange of high-frequency signals with the vehicle V can be ensured.

The lens unit 30 is supported by the first housing end portion 63 of the housing 60. Accordingly, the lens unit 30 can be supported by the housing 60. In the embodiment, the ring member 20 is welded to the flange portion 32 of the lens unit 30 on a radially inner side, and is welded to the first housing end portion 63 of the housing 60 on a radially outer side over the entire circumference. The welding is performed by, for example, laser welding.

In the embodiment, the first shape of the bottom surface portion 71 of the conductive member 70 is a first quadrilateral shape, and the second shape of the circuit board 40 is a second quadrilateral shape. Accordingly, the vehicular camera 100 can be easily manufactured using a member having a common shape.

The resin member 90 may include a magnetic material such as ferrite. Accordingly, the shielding effect can also be imparted to the resin member 90.

At least one of the housing 60 or the lens unit 30 can be formed of a resin. Accordingly, the housing 60 or the lens unit 30 can be easily formed at low cost.

Figure 17:
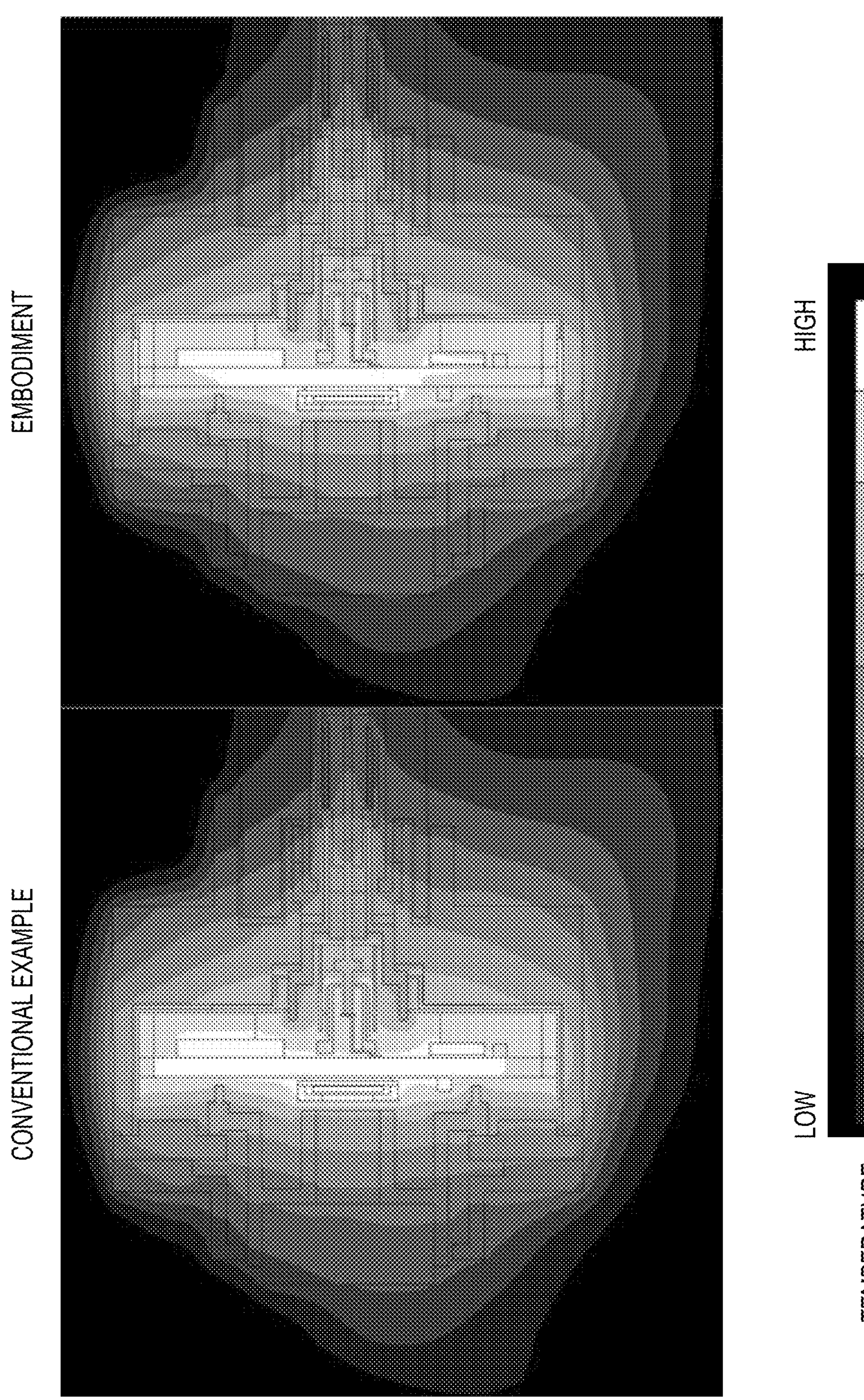
FIG. 17 is a simulation diagram obtained by analyzing, by simulation, heat distribution when a vehicular camera in a conventional example and the vehicular camera according to the embodiment are energized.

FIG. 17 is a simulation diagram obtained by analyzing, by simulation, heat distribution when a vehicular camera in a conventional example and the vehicular camera according to the embodiment are energized. In the vehicular camera in the conventional example, the conductive member does not have the first hole 73_a_ to the fourth hole 73_d_. In the vehicular camera according to the embodiment, the conductive member has the first hole 73_a_ to the fourth hole 73_d_. This simulation diagram illustrates that the vehicular camera according to the embodiment has a wider low-temperature region than the vehicular camera in the conventional example, and the heat dissipation effect of the resin member 90 in the embodiment is more efficient than that in the conventional example.

From the above, at least the following matters are described in the present disclosure. Components corresponding to those in the embodiment are shown in parentheses, but the present disclosure is not limited thereto.

(1) A vehicular camera (vehicular camera 100) including:

a lens unit (lens unit 30) including a first tubular portion (first tubular portion 31) having a first tubular shape and at least one lens disposed inside the first tubular portion and on an optical axis (optical axis L);

a circuit board (circuit board 40) including a first surface (first surface 40_a_) and a second surface (second surface 40_b_) opposite to the first surface;

an imaging element (imaging element 50) electrically connected to a circuit of the circuit board and disposed on the first surface of the circuit board on the optical axis;

a conductive member (conductive member 70) disposed to accommodate at least the circuit board and the imaging element;

a housing (housing 60) configured to accommodate at least the circuit board, the imaging element, and the conductive member, a resin member (resin member 90) having predetermined thermal conductivity, in which the housing includes:

a second tubular portion (large-diameter tubular portion 61) having a second tubular shape and including at least a first inner side surface (first inner side surface 66_a_), a second inner side surface (second inner side surface 66_b_), a third inner side surface (third inner side surface 66_c_), and a fourth inner side surface (fourth inner side surface 66_d_);

a first housing end portion (first housing end portion 63) disposed between the first tubular portion of the lens unit and the circuit board; and a second housing end portion (second housing end portion 64) that is opposite to the first housing end portion in a first direction which is a direction along the optical axis and at least partially faces the second surface of the circuit board, the conductive member includes:

a bottom surface portion (bottom surface portion 71) that at least partially faces the second surface of the circuit board, is disposed at the second housing end portion of the housing, and has a first shape including at least a first side (first side 71_a_), a second side (second side 71_b_), a third side (third side 71_c_), and a fourth side (fourth side 71_d_) in a plan view of the conductive member;

a first planar portion (first planar portion 72_a_) extending from the first side of the bottom surface portion in a second direction, which is a direction away from the second housing end portion of the housing, and disposed along the first inner side surface of the second tubular portion of the housing;

a second planar portion (second planar portion 72_b_) extending in the second direction from the second side of the bottom surface portion and disposed along the second inner side surface of the second tubular portion of the housing;

a third planar portion (third planar portion 72_c_) extending in the second direction from the third side of the bottom surface portion and disposed along the third inner side surface of the second tubular portion of the housing;

a fourth planar portion (fourth planar portion 72*d*) extending in the second direction from the fourth side of the bottom surface portion and disposed along the fourth inner side surface of the second tubular portion of the housing;

at least one first hole (first hole 73*a*) penetrating the first planar portion;

at least one second hole (second hole 73*b*) penetrating the second planar portion;

at least one third hole (third hole 73*c*) penetrating the third planar portion; and at least one fourth hole (fourth hole 73*d*) penetrating the fourth planar portion, the resin member (resin member 90) is disposed at least between the second surface of the circuit board and the bottom surface portion of the conductive member, and the resin member is brought into contact with the first inner side surface of the second tubular portion of the housing through the first hole of the first planar portion of the conductive member, the second inner side surface of the second tubular portion of the housing through the second hole of the second planar portion of the conductive member, the third inner side surface of the second tubular portion of the housing through the third hole of the third planar portion of the conductive member, and the fourth inner side surface of the second tubular portion of the housing through the fourth hole of the fourth planar portion of the conductive member.

Accordingly, the resin member is brought into contact with the inner side surface of the housing through the hole of the conductive member, and thus heat generated inside the housing can be efficiently dissipated. In addition, by appropriately designing the hole of the conductive member in consideration of a noise shielding effect, it is possible to prevent the noise from passing through the hole and prevent deterioration of sealing performance.

In the conductive member, only one of the first planar portion, the second planar portion, the third planar portion and the fourth planar portion may have at least one hole, and the other three planar portions may have no holes. In addition, in the conductive member, only two of the first planar portion, the second planar portion, the third planar portion and the fourth planar portion may each have at least one hole, and the other two planar portions may have no holes. In addition, in the conductive member, only three of the first planar portion, the second planar portion, the third planar portion and the fourth planar portion may each have at least one hole, and the other planar portion may have no holes.

(2) The vehicular camera according to (1), in which the first hole of the first planar portion of the conductive member has a first hole shape, the second hole of the second planar portion of the conductive member has a second hole shape, the third hole of the third planar portion of the conductive member has a third hole shape, and the fourth hole of the fourth planar portion of the conductive member has a fourth hole shape.

Accordingly, the hole of the conductive member can be freely designed.

(3) The vehicular camera according to (2), in which the first hole shape of the first hole, the second hole shape of the second hole, the third hole shape of the third hole, and the fourth hole shape of the fourth hole are circular.

Accordingly, the hole of the conductive member can be easily formed.

(4) The vehicular camera according to (1), in which a plurality of first holes penetrate the first planar portion of the conductive member, a plurality of second holes penetrate the second planar portion of the conductive member, a plurality of third holes penetrate the third planar portion of the conductive member, and a plurality of fourth holes penetrate the fourth planar portion of the conductive member.

Accordingly, since the resin member penetrates the plurality of holes in each planar portion of the conductive member, a heat dissipation effect by the resin member is improved.

(5) The vehicular camera according to (1), in which the conductive member further includes at least one fifth hole (fifth hole 73*e*) penetrating the bottom surface portion.

Accordingly, a member such as a connector can be connected to the circuit board through the fifth hole.

(6) The vehicular camera according to (1), in which a maximum inner diameter of each of the first hole, the second hole, the third hole, and the fourth hole is smaller than half a wavelength of an upper limit frequency of an EMC standard.

Accordingly, it is possible to effectively prevent the noise from passing through the hole and prevent a decrease in EMC which is a performance index of the shielding effect.

(7) The vehicular camera according to (1), in which the resin member is further brought into contact with at least a part of the second surface of the circuit board, at least a part of the first planar portion of the conductive member, at least a part of the second planar portion of the conductive member, at least a part of the third planar portion of the conductive member, at least a part of the fourth planar portion of the conductive member, and at least a part of the bottom surface portion of the conductive member.

Accordingly, since the resin member is brought into contact with the circuit board and the conductive member, the heat generated in the circuit board can be efficiently dissipated.

(8) The vehicular camera according to (1), in which the circuit board has a second shape including at least a fifth side (fifth side 41), a sixth side (sixth side 42), a seventh side (seventh side 43), and an eighth side (eighth side 44) in a plan view of the circuit board, the circuit board includes at least a first end surface (first end surface 40*c*1) corresponding to the fifth side, a second end surface (second end surface 40*c*2) corresponding to the sixth side, a third end surface (third end surface 40*c*3) corresponding to the seventh side, and a fourth end surface (fourth end surface 40*c*4) corresponding to the eighth side, at least a part of the first planar portion of the conductive member faces the first end surface of the circuit board, at least a part of the second planar portion of the conductive member faces the second end surface of the circuit board, at least a part of the third planar portion of the conductive member faces the third end surface of the circuit board, at least a part of the fourth planar portion of the conductive member faces the fourth end surface of the circuit board, and the resin member is further brought into contact with at least a part of the first end surface of the circuit board, at least a part of the second end surface of the circuit board, at least a part of the third end surface of the circuit board, and at least a part of the fourth end surface of the circuit board.

Accordingly, since the resin member is brought into contact with the end surface of the circuit board, the heat generated in the circuit board can be efficiently dissipated.

(9) The vehicular camera according to (8), in which at least a part of an interface of the resin member is located between the first surface of the circuit board and the second surface of the circuit board in the first direction.

Accordingly, since the resin member is brought into contact with the end surface of the circuit board, the heat generated in the circuit board can be efficiently dissipated.

(10) The vehicular camera according to (1), in which a first gap (first gap 74*a*) exists between the first planar portion and the second planar portion of the conductive member, a second gap (second gap 74*b*) exists between the second planar portion and the third planar portion of the conductive member, a third gap (third gap 74*c*) exists between the third planar portion and the fourth planar portion of the conductive member, a fourth gap (fourth gap 74*d*) exists between the fourth planar portion and the first planar portion of the conductive member, and the resin member is disposed in the first gap, the second gap, the third gap, and the fourth gap.

Accordingly, since the resin member is disposed in the gap of the conductive member, it is possible to efficiently dissipate the heat generated inside the housing.

(11) The vehicular camera according to (10), in which the conductive member is formed by bending a single metal plate.

Accordingly, the conductive member can be easily formed at low cost.

(12) The vehicular camera according to (10), in which the second tubular portion of the housing includes a first wall (first wall 65*a*), a second wall (second wall 65*b*), a third wall (third wall 65*c*), and a fourth wall (fourth wall 65*d*), the first wall of the second tubular portion corresponds to the first planar portion of the conductive member, the second wall of the second tubular portion is formed continuously with the first wall, and corresponds to the second planar portion of the conductive member, the third wall of the second tubular portion is formed continuously with the second wall, and corresponds to the third planar portion of the conductive member, the fourth wall of the second tubular portion is formed continuously with the third wall and the first wall, and corresponds to the fourth planar portion of the conductive member, the housing includes:

a first housing corner (first housing corner 67*a*) formed between the first wall and the second wall of the second tubular portion and having a first corner inner side surface (first corner inner side surface 68*a*);

a second housing corner (second housing corner 67*b*) formed between the second wall and the third wall of the second tubular portion and having a second corner inner side surface (second corner inner side surface 68*b*);

a third housing corner (third housing corner 67*c*) formed between the third wall and the fourth wall of the second tubular portion and having a third corner inner side surface (third corner inner side surface 68*c*); and a fourth housing corner (fourth housing corner 67*d*) formed between the fourth wall and the first wall of the second tubular portion and having a fourth corner inner side surface (fourth corner inner side surface 68*d*), and the resin member is further brought into contact with the first corner inner side surface of the first housing corner of the second tubular portion through the first gap, the second corner inner side surface of the second housing corner of the second tubular portion through the second gap, the third corner inner side surface of the third housing corner of the second tubular portion through the third gap, and the fourth corner inner side surface of the fourth housing corner of the second tubular portion through the fourth gap.

Accordingly, the resin member is brought into contact with the corner inner side surface of the housing through the gap of the conductive member, and thus heat generated inside the housing can be more efficiently dissipated.

(13) The vehicular camera according to (1), in which at least the first planar portion, the second planar portion, the third planar portion, the fourth planar portion, and the bottom surface portion of the conductive member are formed to be connected to each other.

Accordingly, the conductive member can be easily formed.

(14) The vehicular camera according to (13), in which at least the first planar portion, the second planar portion, the third planar portion, the fourth planar portion, and the bottom surface portion of the conductive member are formed by drawing a single metal plate.

The conductive member can be easily formed at low cost.

(15) The vehicular camera according to (5), in which a sixth hole (sixth hole 69*a*) penetrating the second housing end portion of the housing in the first direction is formed in the second housing end portion of the housing, the second housing end portion of the housing has a housing end surface (housing end surface 69) that faces at least a part of the second surface of the circuit board, the bottom surface portion of the conductive member is disposed correspondingly to the housing end surface of the second housing end portion of the housing, the vehicular camera further includes a connector (connector 80) disposed across the inside and outside of the housing through the sixth hole of the second housing end portion of the housing and the fifth hole of the bottom surface portion of the conductive member, the connector includes:

a first connector end (first connector end 81) disposed inside the housing; and a second connector end (second connector end 82) opposite to the first connector end and disposed outside the housing, the first connector end is electrically connected to the second surface of the circuit board, and the second connector end is electrically connected to a wire of the vehicle when the vehicular camera is disposed in the vehicle.

Accordingly, power supply from the vehicle and exchange of signals with the vehicle can be ensured.

(16) The vehicular camera according to (15), in which the connector is a coaxial connector having a signal terminal (signal terminal 83) and a ground terminal (ground terminal 84).

Accordingly, the power supply from the vehicle and the exchange of high-frequency signals with the vehicle can be ensured.

(17) The vehicular camera according to (1), in which the lens unit is supported by the first housing end portion of the housing.

Accordingly, the lens unit can be supported by the housing.

(18) The vehicular camera according to (1), in which the first shape of the bottom surface portion of the conductive member is a first quadrilateral shape, and the second shape of the circuit board is a second quadrilateral shape.

Accordingly, the vehicular camera can be easily manufactured using a member having a common shape.

(19) The vehicular camera according to (1), in which the resin member includes a magnetic material.

Accordingly, the shielding effect can also be imparted to the resin member.

(20) The vehicular camera according to (1), in which the housing or the lens unit is formed of a resin.

Accordingly, the housing or the lens unit can be easily formed at low cost.

Although the embodiments have been described above with reference to the accompanying drawings, the present disclosure is not limited thereto. It is apparent to those skilled in the art that various modifications, corrections, substitutions, additions, deletions, and equivalents can be conceived within the scope described in the claims, and it is understood that such modifications, corrections, substitutions, additions, deletions, and equivalents also fall within the technical scope of the present disclosure. In addition, constituent elements in the embodiment described above may be freely combined without departing from the gist of the invention.

INDUSTRIAL APPLICABILITY

The present disclosure is useful as a vehicular camera capable of efficiently dissipating heat generated inside a housing.

CROSS-REFERENCE TO RELATED APPLICATIONS

This application is based on and claims priority under 35 USC 119 from Japanese Patent Application No. 2024-026756 filed on Feb. 26, 2024, the contents of which are incorporated herein by reference.

What is claimed is:

1. A vehicular camera comprising:

a lens unit including a first tubular portion having a first tubular shape and at least one lens disposed inside the first tubular portion and on an optical axis;

a circuit board including a first surface and a second surface opposite to the first surface;

an imaging element electrically connected to the circuit board and disposed on the first surface of the circuit board on the optical axis;

a conductive member disposed to accommodate at least the circuit board and the imaging element;

a housing accommodating at least the circuit board, the imaging element, and the conductive member; and a resin member having predetermined thermal conductivity, wherein the housing includes:

a second tubular portion having a second tubular shape and including at least a first inner side surface, a second inner side surface, a third inner side surface, and a fourth inner side surface;

a first housing end portion disposed between the first tubular portion of the lens unit and the circuit board; and a second housing end portion disposed opposite to the first housing end portion in a first direction which is a direction along the optical axis and at least partially faces the second surface of the circuit board, the conductive member includes:

a bottom surface portion that at least partially faces the second surface of the circuit board, is disposed at the second housing end portion of the housing, and has a first shape including at least a first side, a second side, a third side, and a fourth side in a plan view of the conductive member;

a first planar portion extending from the first side of the bottom surface portion in a second direction, which is a direction away from the second housing end portion of the housing, and disposed along the first inner side surface of the second tubular portion of the housing;

a second planar portion extending in the second direction from the second side of the bottom surface portion and disposed along the second inner side surface of the second tubular portion of the housing;

a third planar portion extending in the second direction from the third side of the bottom surface portion and disposed along the third inner side surface of the second tubular portion of the housing;

a fourth planar portion extending in the second direction from the fourth side of the bottom surface portion and disposed along the fourth inner side surface of the second tubular portion of the housing;

at least one first hole penetrating the first planar portion;

at least one second hole penetrating the second planar portion;

at least one third hole penetrating the third planar portion; and at least one fourth hole penetrating the fourth planar portion, the resin member is disposed at least between the second surface of the circuit board and the bottom surface portion of the conductive member, and the resin member is brought into contact with the first inner side surface of the second tubular portion of the housing through the first hole of the first planar portion of the conductive member, the second inner side surface of the second tubular portion of the housing through the second hole of the second planar portion of the conductive member, the third inner side surface of the second tubular portion of the housing through the third hole of the third planar portion of the conductive member, and the fourth inner side surface of the second tubular portion of the housing through the fourth hole of the fourth planar portion of the conductive member.

2. The vehicular camera according to claim 1, wherein the first hole of the first planar portion of the conductive member has a first hole shape,
the second hole of the second planar portion of the conductive member has a second hole shape,
the third hole of the third planar portion of the conductive member has a third hole shape, and
the fourth hole of the fourth planar portion of the conductive member has a fourth hole shape.

3. The vehicular camera according to claim 2, wherein the first hole shape of the first hole, the second hole shape of the second hole, the third hole shape of the third hole, and the fourth hole shape of the fourth hole are circular.

4. The vehicular camera according to claim 1, wherein
a plurality of first holes penetrate the first planar portion of the conductive member,
a plurality of second holes penetrate the second planar portion of the conductive member,
a plurality of third holes penetrate the third planar portion of the conductive member, and
a plurality of fourth holes penetrate the fourth planar portion of the conductive member.

5. The vehicular camera according to claim 1, wherein the conductive member further includes at least one fifth hole penetrating the bottom surface portion.

6. The vehicular camera according to claim 1, wherein a maximum inner diameter of each of the first hole, the second hole, the third hole, and the fourth hole is smaller than half a wavelength of an upper limit frequency of an EMC standard.

7. The vehicular camera according to claim 1, wherein the resin member is further brought into contact with at least a part of the second surface of the circuit board, at least a part of the first planar portion of the conductive member, at least a part of the second planar portion of the conductive member, at least a part of the third planar portion of the conductive member, at least a part of the fourth planar portion of the conductive member, and at least a part of the bottom surface portion of the conductive member.

8. The vehicular camera according to claim 1, wherein
the circuit board has a second shape including at least a fifth side, a sixth side, a seventh side, and an eighth side in a plan view of the circuit board,
the circuit board includes at least a first end surface corresponding to the fifth side, a second end surface corresponding to the sixth side, a third end surface corresponding to the seventh side, and a fourth end surface corresponding to the eighth side,
at least a part of the first planar portion of the conductive member faces the first end surface of the circuit board,
at least a part of the second planar portion of the conductive member faces the second end surface of the circuit board,
at least a part of the third planar portion of the conductive member faces the third end surface of the circuit board,
at least a part of the fourth planar portion of the conductive member faces the fourth end surface of the circuit board, and
the resin member is further brought into contact with at least a part of the first end surface of the circuit board, at least a part of the second end surface of the circuit board, at least a part of the third end surface of the circuit board, and at least a part of the fourth end surface of the circuit board.

9. The vehicular camera according to claim 8, wherein at least a part of an interface of the resin member is located between the first surface of the circuit board and the second surface of the circuit board in the first direction.

10. The vehicular camera according to claim 1, wherein
a first gap exists between the first planar portion and the second planar portion of the conductive member,
a second gap exists between the second planar portion and the third planar portion of the conductive member,
a third gap exists between the third planar portion and the fourth planar portion of the conductive member,
a fourth gap exists between the fourth planar portion and the first planar portion of the conductive member, and
the resin member is disposed in the first gap, the second gap, the third gap, and the fourth gap.

11. The vehicular camera according to claim 10, wherein the conductive member is formed by bending a single metal plate.

12. The vehicular camera according to claim 10, wherein
the second tubular portion of the housing includes a first wall, a second wall, a third wall, and a fourth wall,
the first wall of the second tubular portion corresponds to the first planar portion of the conductive member,
the second wall of the second tubular portion is formed continuously with the first wall, and corresponds to the second planar portion of the conductive member,
the third wall of the second tubular portion is formed continuously with the second wall, and corresponds to the third planar portion of the conductive member,
the fourth wall of the second tubular portion is formed continuously with the third wall and the first wall, and corresponds to the fourth planar portion of the conductive member,
the housing includes:
- a first housing corner formed between the first wall and the second wall of the second tubular portion and having a first corner inner side surface;
- a second housing corner formed between the second wall and the third wall of the second tubular portion and having a second corner inner side surface;
- a third housing corner formed between the third wall and the fourth wall of the second tubular portion and having a third corner inner side surface; and
- a fourth housing corner formed between the fourth wall and the first wall of the second tubular portion and having a fourth corner inner side surface, and the resin member is further brought into contact with the first corner inner side surface of the first housing corner of the second tubular portion through the first gap, the second corner inner side surface of the second housing corner of the second tubular portion through the second gap, the third corner inner side surface of the third housing corner of the second tubular portion through the third gap, and the fourth corner inner side surface of the fourth housing corner of the second tubular portion through the fourth gap.

13. The vehicular camera according to claim 1, wherein at least the first planar portion, the second planar portion, the third planar portion, the fourth planar portion, and the bottom surface portion of the conductive member are formed to be connected to each other.

14. The vehicular camera according to claim 13, wherein at least the first planar portion, the second planar portion, the third planar portion, the fourth planar portion, and the bottom surface portion of the conductive member are formed by drawing a single metal plate.

15. The vehicular camera according to claim 5, wherein a sixth hole penetrating the second housing end portion of the housing in the first direction is formed in the second housing end portion of the housing, the second housing end portion of the housing has a housing end surface that faces at least a part of the second surface of the circuit board, the bottom surface portion of the conductive member is disposed correspondingly to the housing end surface of the second housing end portion of the housing, the vehicular camera further includes a connector disposed across the inside and outside of the housing through the sixth hole of the second housing end portion of the housing and the fifth hole of the bottom surface portion of the conductive member, the connector includes:

a first connector end disposed inside the housing; and a second connector end opposite to the first connector end and disposed outside the housing, the first connector end is electrically connected to the second surface of the circuit board, and the second connector end is electrically connected to a wire of the vehicle when the vehicular camera is disposed in the vehicle.

16. The vehicular camera according to claim 15, wherein the connector is a coaxial connector having a signal terminal and a ground terminal.

17. The vehicular camera according to claim 1, wherein the lens unit is supported by the first housing end portion of the housing.

18. The vehicular camera according to claim 8, wherein the first shape of the bottom surface portion of the conductive member is a first quadrilateral shape, and the second shape of the circuit board is a second quadrilateral shape.

19. The vehicular camera according to claim 1, wherein the resin member includes a magnetic material.

20. The vehicular camera according to claim 1, wherein the housing or the lens unit is formed of a resin.

* * * * *